(12) United States Patent
Obeshaw

(10) Patent No.: US 6,586,110 B1
(45) Date of Patent: Jul. 1, 2003

(54) CONTOURED METAL STRUCTURAL MEMBERS AND METHODS FOR MAKING THE SAME

(75) Inventor: Dale Francis Obeshaw, Salt Lake City, UT (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/704,228

(22) Filed: Nov. 1, 2000

Related U.S. Application Data

(60) Provisional application No. 60/216,636, filed on Jul. 7, 2000.

(51) Int. Cl.[7] .............................. B32B 3/12; B32B 1/08; F16L 9/18
(52) U.S. Cl. ................. 428/593; 428/598; 428/596; 428/603; 428/116; 428/118; 138/148; 29/234; 156/187
(58) Field of Search ............................. 428/593, 598, 428/603, 596, 116, 117, 118; 138/148; 29/234; 156/187, 188, 190

(56) References Cited

U.S. PATENT DOCUMENTS

| | | | |
|---|---|---|---|
| 1,677,714 A | * 7/1928 | Frease | 138/115 |
| 1,930,285 A | * 10/1933 | Robinson | 113/116 |
| 2,423,870 A | * 7/1947 | Blessing | 154/129 |
| 2,940,557 A | * 6/1960 | Herbert | 428/593 |
| 3,332,446 A | * 7/1967 | Mann | 138/114 |
| 3,489,052 A | 1/1970 | Colyer et al. | 84/422 |
| 3,553,978 A | 1/1971 | Williams | 64/1 |
| 3,592,884 A | 7/1971 | Williams | 264/45 |
| 3,622,437 A | 11/1971 | Hobaica et al. | 161/168 |
| 3,638,445 A | 2/1972 | Francois | 64/23 |
| 3,651,661 A | 3/1972 | Darrow | 64/1 |
| 3,989,562 A | 11/1976 | Hladik et al. | 156/79 |
| 4,013,810 A | 3/1977 | Long | 428/308 |
| 4,025,675 A | 5/1977 | Jonda | 428/36 |
| 4,089,190 A | 5/1978 | Worgan et al. | 64/15 |
| 4,128,963 A | 12/1978 | Dano | 264/46.6 |
| 4,135,019 A | 1/1979 | Kourtides et al. | 428/117 |
| 4,161,231 A | * 7/1979 | Wilkinson | 181/292 |
| 4,171,626 A | 10/1979 | Yates et al. | 64/15 |
| 4,178,713 A | 12/1979 | Higuchi | 43/18 GF |
| 4,185,472 A | 1/1980 | Yates et al. | 64/15 |
| 4,212,693 A | 7/1980 | Saito et al. | 156/173 |
| 4,236,386 A | 12/1980 | Yates et al. | 64/15 |
| 4,238,539 A | 12/1980 | Yates et al. | 428/36 |
| 4,238,540 A | 12/1980 | Yates et al. | 428/36 |
| 4,248,062 A | 2/1981 | McLain et al. | 64/15 |
| 4,259,382 A | 3/1981 | Schwan | 428/36 |
| 4,265,951 A | 5/1981 | Yates et al. | 428/36 |
| 4,279,275 A | 7/1981 | Stanwood et al. | 138/109 |
| 4,291,205 A | 9/1981 | Kamon et al. | 179/181 R |
| 4,325,174 A | 4/1982 | Smith et al. | 29/434 |
| 4,355,061 A | 10/1982 | Zeigler | 428/36 |
| 4,358,284 A | 11/1982 | Federmann et al. | 464/181 |
| 4,380,443 A | 4/1983 | Federmann et al. | 464/181 |
| 4,385,952 A | 5/1983 | Futakuchi et al. | 156/174 |
| 4,421,497 A | 12/1983 | Federmann et al. | 464/181 |
| 4,531,619 A | 7/1985 | Eckels | 188/371 |

(List continued on next page.)

FOREIGN PATENT DOCUMENTS

GB 2323146 9/1998 ............ F16F/7/12

*Primary Examiner*—John J. Zimmerman
(74) *Attorney, Agent, or Firm*—Edmund P. Anderson

(57) ABSTRACT

Contoured metal-containing structural members and methods for making the same. The contoured structural members comprise metal-containing materials sandwiching a support or stabilizing structure. The contoured structure can be provided by tube rolling (or roll wrapping) the metal-containing materials and the support structure together and then, if necessary, bonding them or connecting them. With a contoured and generally non-flat structure, applications for the structural members of the present invention are nearly limitless.

28 Claims, 16 Drawing Sheets

U.S. PATENT DOCUMENTS

| | | | |
|---|---|---|---|
| 4,540,385 A | 9/1985 | Krude | 464/113 |
| 4,551,116 A | 11/1985 | Krude | 464/181 |
| 4,556,400 A | 12/1985 | Krüde et al. | 464/181 |
| 4,573,707 A | 3/1986 | Pabst | 280/792 |
| 4,600,619 A * | 7/1986 | Chee et al. | 428/118 |
| 4,605,385 A | 8/1986 | Pück et al. | 464/181 |
| 4,663,819 A | 5/1987 | Traylor | 29/432 |
| 4,664,644 A | 5/1987 | Kumata et al. | 464/180 |
| 4,681,556 A | 7/1987 | Palmer | 464/181 |
| 4,699,523 A * | 10/1987 | Hagemeister | 384/103 |
| 4,706,364 A | 11/1987 | Aubry | 29/458 |
| 4,722,717 A | 2/1988 | Salzman et al. | 464/181 |
| 4,742,899 A | 5/1988 | Thornton | 188/377 |
| 4,773,891 A | 9/1988 | Hoffmann | 464/181 |
| 4,803,108 A | 2/1989 | Leuchten et al. | 428/118 |
| 4,838,833 A | 6/1989 | Coursin | 464/181 |
| 4,859,517 A | 8/1989 | Hull | 428/116 |
| 4,861,649 A | 8/1989 | Browne | 428/240 |
| 4,885,865 A | 12/1989 | Rumbaugh | 43/18.5 |
| 4,892,433 A | 1/1990 | Schreiber | 403/359 |
| 4,946,721 A | 8/1990 | Kindervater et al. | 428/36.1 |
| 4,952,195 A | 8/1990 | Traylor | 464/181 |
| 4,968,545 A | 11/1990 | Fellman et al. | 428/36.1 |
| 5,006,391 A | 4/1991 | Biersach | 428/116 |
| 5,043,217 A | 8/1991 | Peters et al. | 428/397 |
| 5,061,533 A | 10/1991 | Gomi et al. | 428/36.3 |
| 5,062,914 A | 11/1991 | Fuchs et al. | 156/172 |
| 5,085,467 A | 2/1992 | Converse | 280/777 |
| 5,087,491 A | 2/1992 | Barrett | 428/34.5 |
| 5,102,723 A | 4/1992 | Pepin | 428/223 |
| 5,127,975 A | 7/1992 | Zackrisson et al. | 156/171 |
| 5,131,970 A | 7/1992 | Potter et al. | 156/205 |
| 5,139,281 A | 8/1992 | Dzioba | 280/775 |
| 5,140,913 A | 8/1992 | Takeichi et al. | 105/397 |
| 5,165,977 A | 11/1992 | Dynes et al. | 428/40 |
| 5,192,384 A | 3/1993 | Barrier et al. | 156/189 |
| 5,192,623 A | 3/1993 | Gewelber | 428/593 |
| 5,195,779 A | 3/1993 | Aoyama et al. | 280/784 |
| 5,225,016 A | 7/1993 | Sarh | 156/156 |
| 5,236,529 A | 8/1993 | Ferrier et al. | 156/171 |
| 5,239,888 A | 8/1993 | Sevault et al. | 74/492 |
| 5,250,132 A | 10/1993 | Lapp et al. | 156/173 |
| 5,256,969 A | 10/1993 | Miyajima et al. | 324/322 |
| 5,261,616 A | 11/1993 | Crane et al. | 242/7.22 |
| 5,261,991 A | 11/1993 | Zackrisson et al. | 156/294 |
| 5,302,428 A * | 4/1994 | Steele et al. | 428/34.9 |
| 5,306,371 A | 4/1994 | Ramey | 156/171 |
| 5,309,620 A | 5/1994 | Shinohara et al. | 29/432 |
| 5,313,987 A | 5/1994 | Röber et al. | 138/137 |
| 5,320,579 A | 6/1994 | Hoffmann | 464/181 |
| 5,332,606 A | 7/1994 | Pearce | 428/363 |
| 5,342,465 A | 8/1994 | Bronowicki et al. | 156/175 |
| 5,344,038 A | 9/1994 | Freeman et al. | 220/453 |
| 5,348,052 A | 9/1994 | Crane et al. | 138/174 |
| 5,363,717 A | 11/1994 | Eicholsz et al. | 74/493 |
| 5,370,417 A | 12/1994 | Kelman et al. | 280/751 |
| 5,397,272 A | 3/1995 | Smiley et al. | 464/181 |
| 5,419,416 A | 5/1995 | Miyashita et al. | 188/371 |
| 5,423,722 A | 6/1995 | Beauch et al. | 464/151 |
| 5,436,080 A | 7/1995 | Inoue et al. | 428/546 |
| 5,437,450 A | 8/1995 | Akatsuka et al. | 273/80 B |
| 5,447,765 A | 9/1995 | Crane | 428/369 |
| 5,449,024 A | 9/1995 | Röber et al. | 138/137 |
| 5,451,472 A * | 9/1995 | Gregg et al. | 428/593 |
| RE35,081 E | 11/1995 | Quigley | 428/36.2 |
| 5,484,498 A | 1/1996 | Hogarth et al. | 156/189 |
| 5,499,661 A | 3/1996 | Odru et al. | 138/124 |
| 5,503,431 A | 4/1996 | Yamamoto | 280/777 |
| 5,507,477 A | 4/1996 | Manning et al. | 267/140.3 |
| 5,537,789 A | 7/1996 | Minke et al. | 52/313 |
| 5,538,282 A | 7/1996 | White et al. | 280/779 |
| 5,540,877 A | 7/1996 | Repetto et al. | 264/513 |
| 5,562,981 A | 10/1996 | Ehrlich | 428/325 |
| 5,567,499 A | 10/1996 | Cundiff et al. | 428/116 |
| 5,569,508 A | 10/1996 | Cundiff | 428/117 |
| 5,571,207 A | 11/1996 | Houser | 623/27 |
| 5,579,809 A | 12/1996 | Millward et al. | 138/174 |
| 5,590,565 A | 1/1997 | Palfenier et al. | 74/493 |
| 5,600,912 A | 2/1997 | Smith | 42/76.01 |
| 5,601,892 A | 2/1997 | McIntosh | 428/35.8 |
| 5,624,115 A | 4/1997 | Baum | 273/72 A |
| 5,624,519 A | 4/1997 | Nelson et al. | 156/245 |
| 5,632,940 A | 5/1997 | Whatley | 264/46.4 |
| 5,635,306 A | 6/1997 | Minamida et al. | 428/593 |
| 5,645,668 A | 7/1997 | Lin et al. | 156/175 |
| 5,652,039 A | 7/1997 | Tremain et al. | 428/121 |
| 5,655,975 A | 8/1997 | Nashif | 473/316 |
| 5,660,901 A | 8/1997 | Wong | 428/35.7 |
| 5,662,293 A | 9/1997 | Hower et al. | 244/133 |
| 5,669,718 A | 9/1997 | Sakairi et al. | 384/220 |
| 5,676,216 A | 10/1997 | Palma et al. | 180/90 |
| 5,678,454 A | 10/1997 | Cartwright et al. | 74/493 |
| 5,688,571 A | 11/1997 | Quigley et al. | 428/36.1 |
| 5,690,035 A | 11/1997 | Hatayama et al. | 105/452 |
| 5,697,667 A | 12/1997 | Beaudet et al. | 296/189 |
| 5,698,055 A | 12/1997 | Benkoczy | 156/149 |
| 5,718,212 A | 2/1998 | Allshouse et al. | 124/25.6 |
| 5,725,920 A | 3/1998 | Friedrich et al. | 428/34.7 |
| 5,732,801 A | 3/1998 | Gertz | 188/377 |
| 5,753,113 A | 5/1998 | Hendricks | 210/169 |
| 5,755,558 A | 5/1998 | Reinfelder et al. | 416/230 |
| 5,755,826 A | 5/1998 | Beach et al. | 473/316 |
| 5,773,121 A | 6/1998 | Meteer et al. | 428/117 |
| 5,780,075 A | 7/1998 | Huvey | 425/403 |
| 5,785,931 A | 7/1998 | Maus et al. | 422/180 |
| 5,788,278 A | 8/1998 | Thomas et al. | 280/777 |
| 5,795,524 A | 8/1998 | Basso, Jr. et al. | 264/221 |
| 5,795,536 A | 8/1998 | Gaworowski et al. | 264/571 |
| 5,817,203 A | 10/1998 | Moser | 156/155 |
| 5,820,835 A | 10/1998 | Sheller et al. | 422/180 |
| 5,834,082 A | 11/1998 | Day | 428/56 |
| 5,840,347 A | 11/1998 | Muramatsu et al. | 425/393 |
| 5,848,767 A | 12/1998 | Cappa et al. | 244/158 R |
| 5,849,122 A | 12/1998 | Kenmochi et al. | 156/182 |
| 5,851,336 A | 12/1998 | Cundiff et al. | 156/272.2 |
| 5,865,864 A | 2/1999 | Brück | 55/482 |
| 5,875,596 A | 3/1999 | Muller | 52/239 |
| 5,875,609 A | 3/1999 | Quinif | 52/784.14 |
| 5,875,686 A | 3/1999 | Kinoshita et al. | 74/492 |
| 5,876,654 A | 3/1999 | Blonigen et al. | 264/316 |
| 5,888,601 A | 3/1999 | Quigley et al. | 428/36.1 |
| 5,888,642 A | 3/1999 | Meteer et al. | 428/313.5 |
| 5,894,045 A | 4/1999 | Desrondiers | 428/178 |
| 5,895,699 A | 4/1999 | Corbett et al. | 428/116 |
| 5,899,037 A | 5/1999 | Josey | 52/267 |
| 5,900,194 A | 5/1999 | Ashton | 264/39 |
| 5,902,049 A * | 5/1999 | Heshmat | 384/106 |
| RE36,240 E | 6/1999 | Minke et al. | 52/313 |
| 5,911,438 A | 6/1999 | Anspaugh et al. | 280/777 |
| 5,914,163 A | 6/1999 | Browne | 428/36.1 |
| 5,934,338 A | 8/1999 | Perstnev et al. | 138/149 |
| 5,938,274 A | 8/1999 | Ehrlich | 296/191 |
| 5,944,060 A | 8/1999 | MacKay | 138/140 |
| 5,944,124 A | 8/1999 | Pomerleau et al. | 175/320 |
| 5,945,643 A | 8/1999 | Casser | 181/296 |
| 5,961,245 A | 10/1999 | Garin et al. | 403/322.1 |
| 5,964,536 A | 10/1999 | Kinoshita | 384/441 |
| 5,975,766 A | 11/1999 | Cau | 384/538 |
| 6,062,632 A | 5/2000 | Brachos et al. | 296/189 |
| 6,116,290 A * | 9/2000 | Ohrn et al. | 138/149 |
| 6,227,252 B1 * | 5/2001 | Logan | 138/172 |

* cited by examiner

CONTOURED METAL STRUCTURAL MEMBERS AND METHODS FOR MAKING THE SAME

REFERENCES TO RELATED APPLICATIONS

This application claims priority from U.S. provisional patent application No. 60/216,636, the entire disclosure of which is incorporated herein by reference.

FIELD OF THE INVENTION

The present invention relates to structural members and methods for making the same. In particular, the present invention relates to cored metal contoured parts and methods for making the same.

BACKGROUND OF THE INVENTION

In recent years there has been an increasing emphasis on the use of lightweight materials. One application, for example, has been their use to improve the efficiency of motor vehicles. To that end, the United States Government and the U.S. Council for Automotive Research (USCAR)—which represents Daimler Chrysler, Ford, and General Motors have partnered to form the Partnership for a New Generation of Vehicles (PNGV). One goal of PNGV is to develop technology that can be used to create environmentally friendly vehicles with up to triple the fuel efficiency, while providing today's affordability, performance and safety. For example, PNGV wants to improve the fuel efficiency of today's vehicles from about 28 miles per gallon (mpg) to about 83 mpg and a 40–60% decrease in the present curb weight (3200 pounds).

One method to improve the fuel efficiency is to decrease the weight of today's vehicles and use lighter weight materials. The materials used in today's vehicles, such as steel and aluminum, are quite heavy relative to light-weight materials such as composite materials, but have been necessary to provide sufficient structural properties, including tensile, compression, flexural, interlaminar shear, and in-plane shear strengths and other mechanical and material properties, to meet vehicle design requirements.

One way to increase the structural properties of materials, particularly the torsional or flexural strength, is to make them in a more structurally efficient form. In one structurally efficient form, metals like aluminum and steel have been combined with a supporting structure, such as a honeycomb core material, by sandwiching the honeycomb between panels of the metal. Examples of such combinations have been described in U.S. Pat. Nos. 4,291,205, 5,140,913, 5,192,623, 5,635,306, 5,875,596, and 5,899,037, the disclosures of which are incorporated herein by reference. Such combinations, however, have been limited to relatively flat structures and so their end use has been quite limited.

SUMMARY OF THE INVENTION

The present invention provides contoured metal-containing structural members and methods for making the same. The contoured structural members comprise metal-containing materials sandwiching a support or stabilizing structure. The contoured structure can be provided by tube rolling (or roll wrapping) the metal-containing materials and the support structure together and then, if necessary, bonding them or connecting them. With a contoured and generally non-flat structure, applications for the structural members of the present invention are nearly limitless.

BRIEF DESCRIPTION OF THE DRAWINGS

FIGS. 1–16 are views of structural members and methods of making the same according to the present invention, in which:

FIG. 1 illustrates a structural member in one aspect of the invention;

FIG. 2 illustrates a plurality of layers in the inner or outer portion of the structural member in one aspect of the invention;

FIG. 3 illustrates exemplary configurations of the ribbed structure of the intermediate portion of the structural member in one aspect of the invention;

FIG. 4 illustrates exemplary configurations of the structural member in one aspect of the invention;

FIG. 5 illustrates one process for making the structural member in one aspect of the invention;

FIG. 6 illustrates the lay-up of individual layers in the inner or outer portion of the structural member in one aspect of the invention;

FIGS. 7–9 illustrate several processes for making the structural member in various aspects of the invention;

FIGS. 10 and 11 illustrate exemplary configurations of the structural member in one aspect of the invention;

FIGS. 12–14 illustrate exemplary structural members in several aspects of the invention; and FIGS. 15–16 illustrate several processes for making the structural member in various aspects of the invention.

FIGS. 1–16 presented in conjunction with this description are views of only particular—rather than complete—portions of the structural members and methods of making the same.

DETAILED DESCRIPTION OF THE INVENTION

The following description provides specific details in order to provide a thorough understanding of the present invention. The skilled artisan, however, would understand that the present invention can be practiced without employing these specific details. Indeed, the present invention can be practiced by modifying the illustrated structural member and method and can be used in conjunction with apparatus and techniques conventionally used in the industry.

Figure 1:
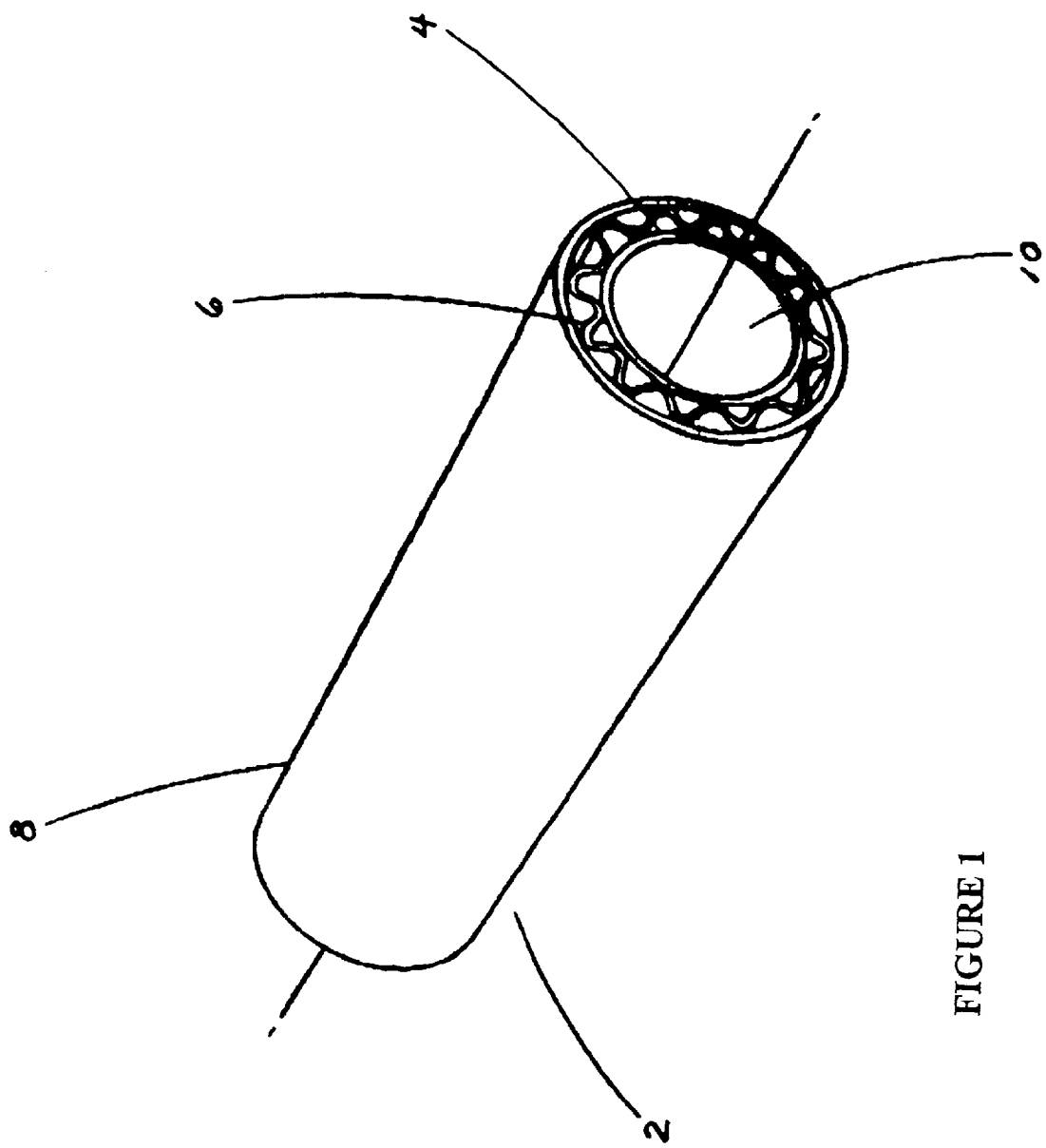

FIG. 1 illustrates one contoured structural member—a tubular member with a substantially circular cross-section—according to the present invention. In the context of the present invention, a "contoured" structural member is any shape, size, or configuration where at least one portion of the outer or inner periphery of such member is substantially non-flat, including curved, geometric or irregular. Preferably, the contoured structural members have a closed surface configuration, such as a surface which facilitates their manufacture as explained below. In the context of the present invention, a "closed" structural member is one having any shape, size, or configuration where at least one portion of the surface (inner and/or outer) of such member is a substantially closed or substantially continuous. Examples of a closed configuration include a tubular, substantially spherical, polygonal, conical, or other similar shape, as well as those illustrated and described herein.

The structural members of the present invention may have a cylindrical or a non-cylindrical configuration such as cones, pyramid, pods, hemispheres or spheres. The structural members of the present invention may also have a circular or a non-circular cross-section such as rectangular, square, hexagonal, octagonal, or the like. They may also comprise very irregular, non-closed, substantially planar surfaces. Indeed, the structural members of the present invention could have any complex contoured shape or combination of contoured shapes. The structural members of the present invention are characterized by the fact that they are substantially non-flat and thereby distinguished from known sheet-like cored metal structures.

In FIG. 1, tubular structural member 2 comprises inner section or portion 4, intermediate section or portion 6, outer section or portion 8, and optional core region 10. Inner portion 4, outer portion 8, and optional core region 10, can be made of any suitable metal-containing material as described below. Intermediate portion 6 is a "cored" structure that both attaches to and supports and/or stabilizes the inner and outer portions.

Core region 10 is located in an inner section of structural member 2 and, as described below, is about the size of the substrate or mandrel used in forming the structural member. Core region 10 can be of any suitable size, shape, or configuration depending primarily on the removable mandrel(s) in the manufacturing process used to make structural member 2, the configuration of structural member 2, and the desired end application of structural member 2.

Core region 10 may be hollow, but may optionally be partially or completely filled with any desired core material such as foam, plastic, conducting or insulating materials, metals and/or the like. Core region 10 containing the core material may be a structural element. The core material may also be added after structural member 2 is formed, or formed integrally into the structure. If the core material is added after the formation of structural member 2, it may be attached to structural member 2 using an adhesive or other suitable bonding means known in the art.

The materials for inner section 4 and outer section 8 can be the same or different materials. Preferably, inner portion 4 and outer portion 8 comprise the same material. In one aspect of the invention, the materials for the inner or outer portions can comprise any suitable metal-containing materials, such as a light or heavy metal or alloys thereof. Suitable light metals include magnesium, aluminum, titanium, zinc, molybdenum, or alloys thereof. Suitable heavy metals include iron, copper, nickel, carbon steel, stainless steel, alloy steel, tin, or alloys thereof.

Since metal-containing materials comprise isotropic fibers, which exhibit similar strength characteristics in all directions, one layer of the metal-containing material is sufficient to form the respective inner or outer portion and provide the desired structural characteristics. Additional layers of the metal-containing material, depending on cost and structural considerations, can also be used to give the desired thickness of the inner or outer portion. Indeed, successive layers of different metal-containing materials may be employed as the inner and/or outer portion.

In another aspect of the invention, the materials for the inner or outer portions can comprise any suitable reinforced resin matrix material (RRMM), which is a resin matrix material (RMM) with continuous or discontinuous reinforcement material embedded in the resin matrix. In one aspect of the invention, the RMM is a organic resin matrix material (ORMM). See, for example, U.S. Pat. No. 5,725,920 and 5,309,620, the disclosures of which are incorporated herein by reference.

In one aspect of the invention, the ORMM can be a thermoset resin. Thermoset resins are polymeric materials which set irreversibly when heated. Examples of thermoset resins include epoxy, bismeleimide, polyester, phenolic, polyimide, melamine, xylene, urethane, phenolic, furan, silicone, vinyl ester, and alkyd resins, or combinations thereof. The thermoset resins can contain various additives as known in the art, such as cross-linking agents, curing agents, fillers, binders, or ultraviolet inhibitors. Preferably, epoxy, vinyl ester, or polyester resins are employed as the thermoset resin in the present invention.

In another aspect of the invention, the ORMM can be a thermoplastic resin matrix material. Thermoplastic resins are polymeric materials which do not set irreversibly when heated, e.g., they soften when exposed to heat and then return to their original condition when cooled. Examples of thermoplastic resins include polypropylene, polyethelene, polyamides (nylons), polyesters (PET, PBT), polyether ketone (PEK), polyether ether ketone (PEEK), polyphenylene sulfide (PPS), polyphenylene oxide (PPO) and its alloys, and polyvinyl resins, or combinations thereof. The thermoplastic resins can contain various additives as known in the art, such as cross-linking agents, curing agents, fillers, binders, or ultraviolet inhibitors. Preferably, polyamides (nylons), polyester, polycarbonate and polypropylene resins are employed as the thermoplastic resin in the present invention.

The material used to reinforce the RMM of the present invention can be in any form which reinforces the resin matrix. Examples of reinforcement forms include unidirectional tape, multidirectional tapes, woven fabrics, roving fabrics, matt fabrics, preforms, fibers, filaments, whiskers, and combinations thereof. The type of material used to reinforce the RMM can be any type serving such a reinforcing function. Preferably, the form of the reinforcement materials for the resin matrix is a fiberous material, such as continuous or discontinuous fibers. Examples of materials that can be employed in the present invention include glass-s, glass-e, aramid, graphite, carbon, ultra-high molecular weight polyethylene, boron, silicon carbide, ceramic, quartz, metals, isotropic metals (aluminum, magnesium and titanium), metal coated organic fibers, CAMP, hybrids of these fibers, or combinations of these fibers. See, for example, U.S. Pat. No. 6,117,534, the disclosure of which is incorporated herein by reference.

In yet another aspect of the invention, non- or partially-cured composite materials are used as the material for the inner and/or outer sections. Composites are a mixture or combination, on a macro scale, of two or more materials that are solid in the finished state, are mutually insoluble, and differ in chemical nature. Any composites known in the art such as laminar, particle, fiber, flake, and filled composites can be employed in the invention. The non- or partially-cured composite materials are a ORMM (thermoset or thermoplastic resin) reinforced with a continuous fiber.

Preferable composite materials used for inner section 4 and outer section 8 include B-stage prepreg materials typically in the form of sheets or laminates, which can be formed by impregnating a plurality of fiber reinforcement tows with a formulated resin. Methods of making B-stage prepreg sheets and the sheets themselves are well known. See, for example, those sheets described in U.S. Pat. No. 4,495,017, the disclosure of which is incorporated herein by reference. When cured, prepreg materials are generally stronger and stiffer than metals while providing greater resistance to fatigue, chemicals, wear and corrosion. Preferable reinforcement for prepregs include aramids, glass materials, nickel carbide, silicone carbide, ceramic, carbons and ultra-high molecular weight polyethylene, or a combination thereof. See, for example, U.S. Pat. Nos. 4,968,545, 5,102,723, 5,499,661, 5,579,609, and 5,725,920, the disclosures of which are incorporated herein by reference. Carbon, glass, metals and especially isotropic metals like aluminum, magnesium and titanium, metal-coated organic fibers, and aramid fibers, or a combination thereof, can also be employed as the fibers. See, for example, U.S. Pat. Nos. 5,601,892 and 5,624,115, the disclosures of which are incorporated herein by reference. Preferably, carbon fibers, glass fibers, or aramid fibers and more preferably Kevlar 29 or 49 fibers are employed in the present invention.

The fiber volume in the prepregs may be varied so as to maximize the mechanical, electrical, and thermal properties. See, for example, U.S. Pat. No. 5,848,767, the disclosure of which is incorporated herein by reference. High fiber volume parts are stiffer and, in the case of thermally conductive fibers, the parts are more thermally conductive. Fiber volumes in the present invention can range from about 5% to about 95%, and preferably range from about 50% to about 65%. The fibers of the prepregs may be oriented within the prepreg material in any desired direction as known in the art, such as about 0 to about 90 degrees, including equal numbers of fibers balanced in opposing directions. See, for example, U.S. Pat. No. 4,946,721, the disclosure of which is incorporated herein by reference.

In yet another aspect of the invention, sheet molding compounds (SMCs) can be used as the materials for the inner or outer portion. SMCs are sheets made up of B-stage thermoset resin reinforced with a discontinuous fiber. SMCs are fully formulated ORMM compounds having discontinuous fiber reinforcement materials which are typically formed into sheet, ply, or laminate—without additional preparation. See, for example, U.S. Pat. No. 6,103,032, the disclosure of which is incorporated herein by reference. The resins that can be used in the SMCs of the present invention include any of the thermoset resins listed above. Preferably, polyester or vinyl esters resins are employed as the resin in SMCs of the present invention. The fibers that can be used in the SMCs of the present invention include any of those listed above. Preferably, glass, carbon, or aramid fibers, and more preferably Kevlar 29 or 49 fibers can be used as the fibers in the SMCs. The fiber volume in the SMC may also be varied so as to maximize the mechanical and thermal properties.

With an unsaturated resin system as its base, SMCs incorporate other materials for desirable processing and molding characteristics and optimum physical and mechanical properties, such as mechanical strength, impact resistance, stiffness, and dimensional stability. These incorporated materials include polymers, fibers for reinforcement, resins, fillers, initiators to promote polymerization, viscosity agents, lubricants, mold release agents, catalysts, thickeners, pigments, polyethylene powders, flame retardants, ultraviolet absorbing agents, and other additives. Each of the additives can provide important properties to the SMC, either during the processing or molding steps or in the finished parts, and can be incorporated in the SMCs of the present invention.

Figure 2:
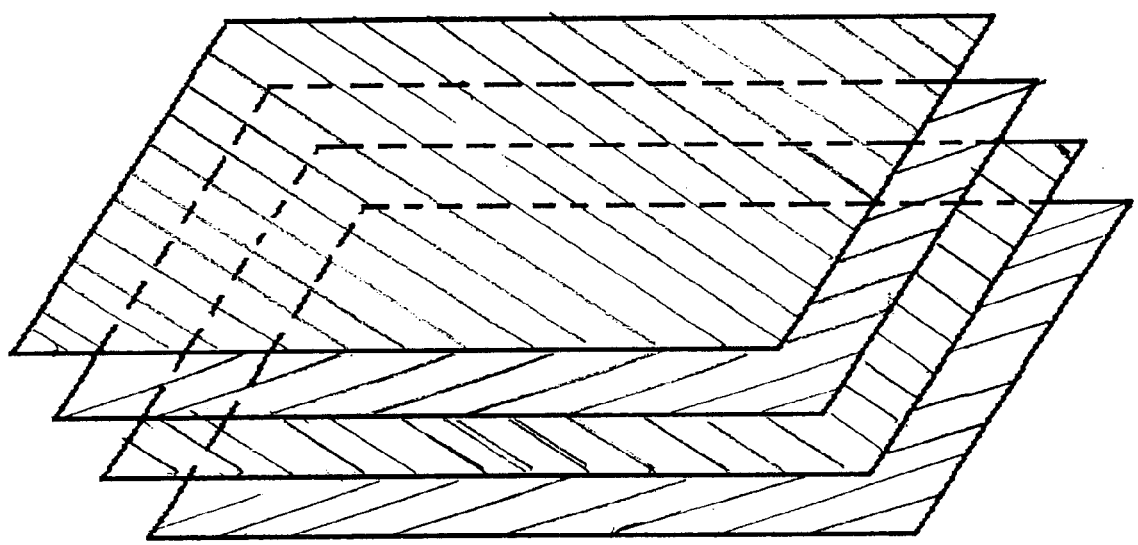

Inner section 4 and outer section 8 contain at least one layer of such ORMM materials. One layer is sufficient to form the respective inner or outer section and provide the desired structural characteristics for structural member 2. Additional layers can be added to improve the strength, stiffness, or other physical characteristics of structural member 2. It is possible to use a single layer with fibers having complementary orientations. It is preferred, however, to use a plurality of layers with complementary orientations to balance intrinsic stresses in the layers that make up the sections that result when, as described below, the B-stage materials are fully cured. To be complementary, the fibers in successive layers should be symmetric and balanced (e.g., by having the fibers offset from the sheet axis by equal and opposite amounts from one layer to another) as shown in FIG. 2. The fibers can also be oriented to meet the design parameters of the component into which they are being incorporated, e.g., to optimize the structural strength against the expected load. The fibers could be oriented at any suitable angle, including at angles ranging from about 0 to about 90 degrees, including in ±15, ±30, ±45, ±60, and ±75 degrees, or as otherwise known in the art. See, for example, U.S. Pat. Nos. Re. 35,081 and 5,061,583, the disclosures of which are incorporated herein by reference.

The configuration of inner portion 4 and outer portion 8 can vary within structural member 2. For example, the materials used (metal or composite), the fiber orientation (for composites), and the curvature, thickness, shape and other characteristics of the inner and/or outer portions (4, 8) can differ along the length and width of structural member 2. See, for example, U.S. Pat. No. 5,718,212, the disclosure of which is incorporated by reference.

Intermediate portion 6 of the structural member 2 of the present invention has any structure which spaces and/or supports inner portion 4 and outer portion 8, as well as enhances the structural properties of those two portions when placed therebetween. Further, intermediate section 6 can be made of any suitable material which separates, supports, stabilizes, couples and attaches inner portion 4 with respect to outer portion 8. Interposing intermediate section 6 between inner section 4 and outer section 8 improves the structural properties according to well-known principles of engineering mechanics and mechanical engineering of structural member 2 over the properties of a member comprising only appropriately shaped inner section 4 and outer section 8 bonded together. Preferably, as illustrated in FIG. 1, the intermediate portion is substantially contiguous with the outer surface of inner section 4 and the inner surface of outer section 8, e.g., the intermediate section 6 contacts the inner section 4 and/or the outer section 8 at discrete points over most—if not all—of their surfaces.

Figure 3:
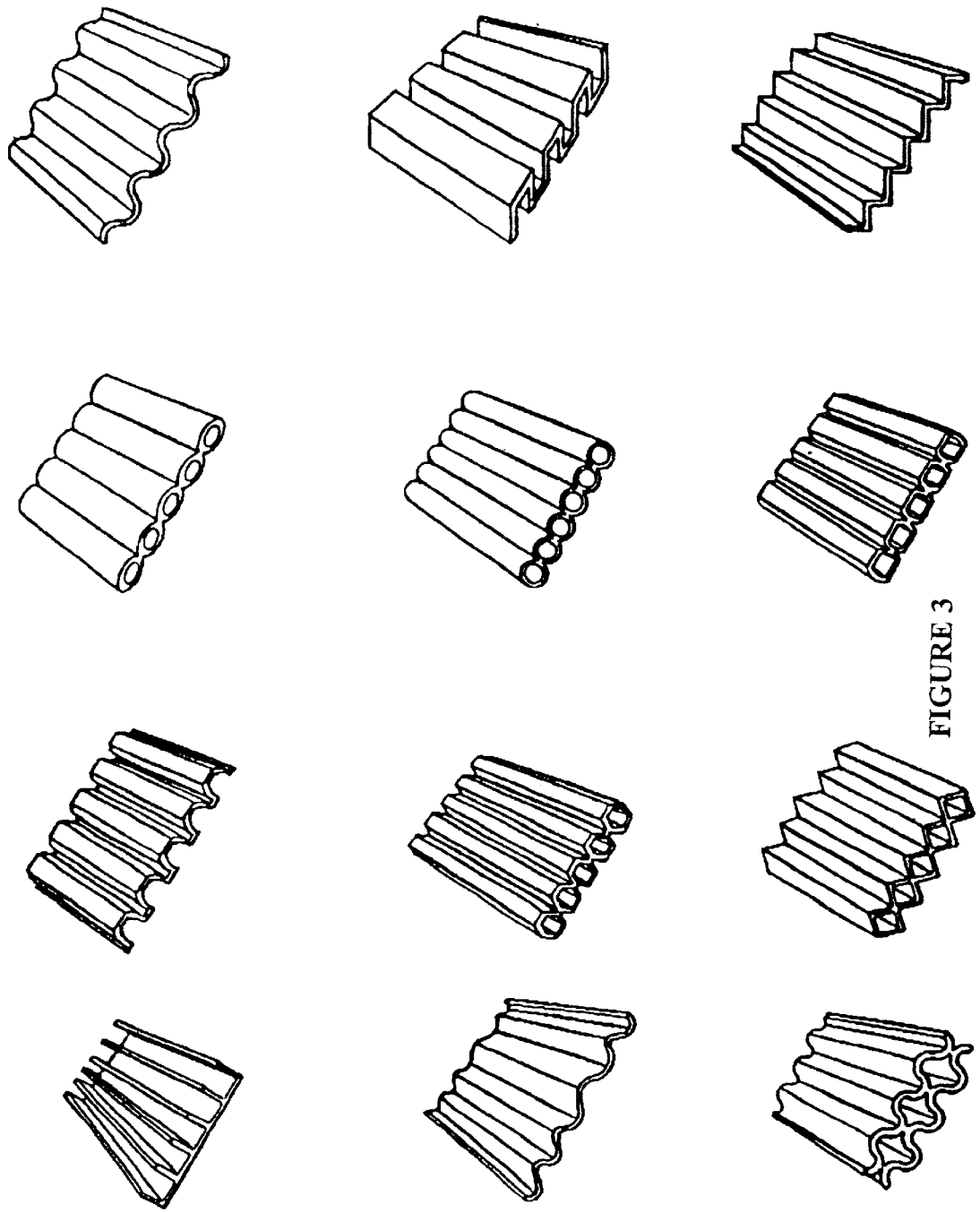

In one aspect of the present invention, intermediate portion 6 has a ribbed structure (RS), or a structure where any single member (rib) of that structure extends continuously from a location proximate the inner (or outer) portion to a location proximate the outer (or inner) portion. In another aspect of the invention, the RS is a structure where any rib connects at one end to a location proximate the at least one layer of the inner (or outer) portion and the other ends abuts or connects to another rib. Examples of RSs include corrugated materials, posts, curvilinear materials, honeycomb cores, and the like. These structures, as well as other RSs, are illustrated in FIG. 3.

A RS is advantageous because, for the additional weight added, the structural properties of the structural member are often substantially increased. The RSs contain both "ribs" and a large volume of voids. The "ribs" of the RS enhance the structural properties of the structural member while the voids are provided to minimize the weight of the RS. The respective amounts of ribs and voids present in the RSs used in the present invention depend on the configuration of the RS selected, e.g., which of those illustrated in FIG. 3 is selected. Preferably, the amount of voids should be maximized and the amount of ribs minimized, thereby giving the minimum weight for the maximum strength, provided the necessary (or desired) structural properties of the RS or the structural member is obtained.

The RSs employed in the present invention can be incorporated into the structural member in any suitable manner. In one aspect of the invention, the RS can be incorporated as a standalone "rib" extending from the at least one layer of the inner portion to the at least one layer of the outer portion, such as the configurations illustrated in FIG. 3. In another aspect of the invention, the rib can be connected to a supporting sheet(s) or another rib(s) where the sheet(s) or other rib(s) itself is connected to the at least one layer of the inner or outer portion.

If desired, additional materials can be incorporated into the ribbed structure. Examples of additional materials that can be incorporated into the RS include be filled with materials other than air, such as resins, foams, insulating materials, or NVH (noise, vibration, or harshness) damping materials, and/or the like.

The RS need not be uniform in the structural member. In one aspect of the embodiment, the type of ribs in the RS can vary from location to location. Further, multiples types of RSs can be combined in the at least one layer of the intermediate portion. In another aspect of the invention, the periodicity and/or thickness of the ribs can be changed in different areas of the at least one layer of the intermediate portion. In another aspect of the invention, the strength and other physical properties of the ribs can change from one location to another.

The ribs of the RS can be made of any suitable material which exhibits the desired structural properties. Suitable materials include any material known in the art to provide such a function, including materials having individual cells like beads, corrugated materials, thermoplastic molded materials, honeycomb materials, woods (balsas), and foams such as rigid expanded plastic foams, polymer foams, metal components, flexible metal (i.e., aluminum) foams, or any combination of these materials. See, for example, U.S. Pat. Nos. 5,344,038, 4,573,707, 5,562,981, 4,128,963, 4,968, 545, and 5,894,045, the disclosures of which are incorporated herein by reference.

A preferred intermediate portion 6 may be formed using honeycomb materials (also known as honeycomb cores). These materials usually comprise a thin sheet (or sheets) of material, such as paper or aluminum foil, which is formed into a variety of random or geometric cellular configurations. See U.S. Pat. No. 5,876,654, the disclosure of which is incorporated herein by reference. Honeycomb cores, which have a geometric cellular configuration, are known to have structural properties or characteristics that are superior to most foam or solid cores with a comparable density. Honeycomb cores can be made of various shapes and types of materials such as aluminum, aramid materials such as Korex®, nylon materials such as Nomex®, plastic, reinforced phenols, carbons, and fiberglass, or a combination thereof. Preferably, honeycombs made of Nomex® are employed as the material for intermediate portion 6.

The material and configuration (width, length, and geometric shape) of the cells can be optimized to provide the desired support and/or stabilization to the inner and outer portions. For example, the cell size can range from about ⅛ to about ¾ inches, and is preferably about 3/16 inches.

The cells of the honeycomb cores can be filled with materials other than air, such as resins, foams, insulating materials, or NVH (noise, vibration, or harshness) damping materials, and/or the like. The type of material used, the thickness, the cell configuration, and "fill-in" material for intermediate portion 6 can vary along the length of structural member 2.

The structural member of the present invention may, if desired, have additional layers or portions on the outside of outer portion 8. In one example, a layer of metal, insulation, another composite material, or honeycomb core material may be placed over outer portion 8. Numerous additional portions or layers, including similar or different composite materials, could be added in a similar manner. In addition, at least one structural component, such as a bracket, coupler, cap, or the like could be located on the end(s) of structural member 2.

Figure 4:
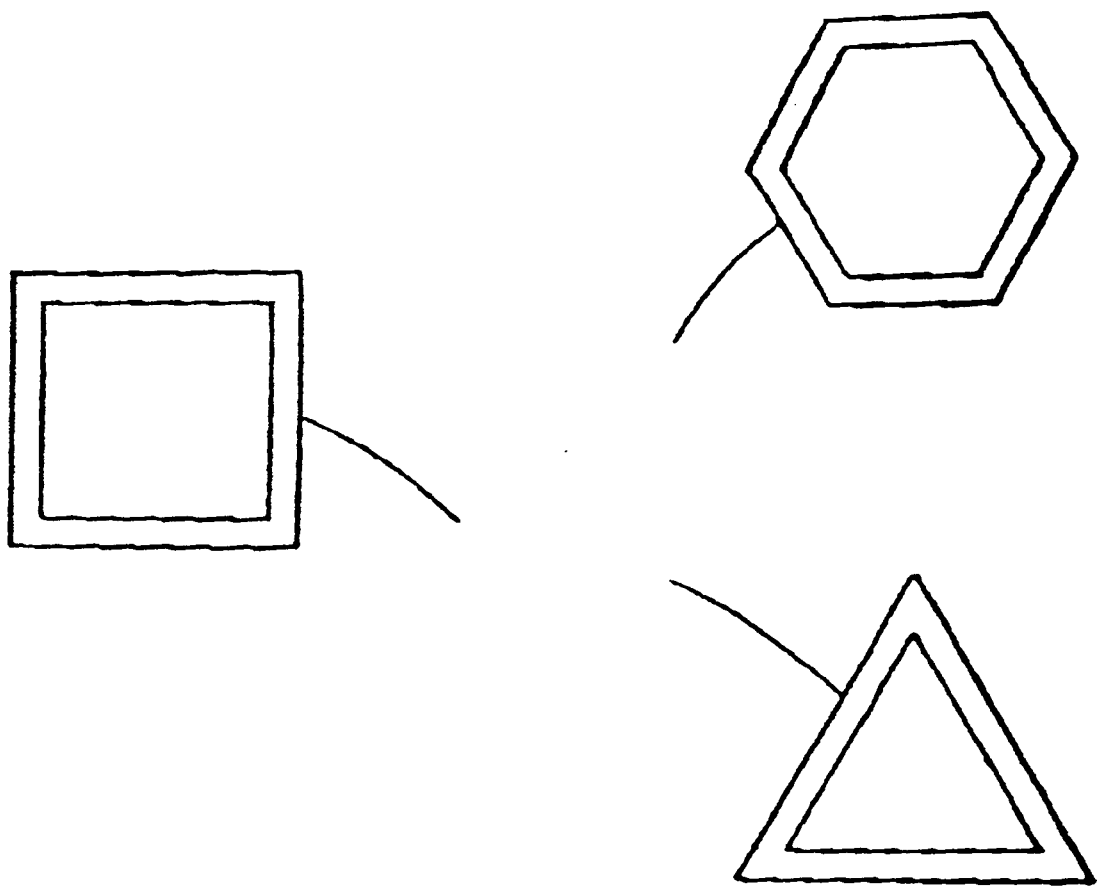

The structural member of the present invention may have any substantially non-flat contour or configuration. FIG. 4 illustrates several such configurations. The structural members illustrated in FIG. 4 differ from the structural member illustrated in FIG. 1 in that the cross-section of the tube is not substantially circular.

Figure 12:
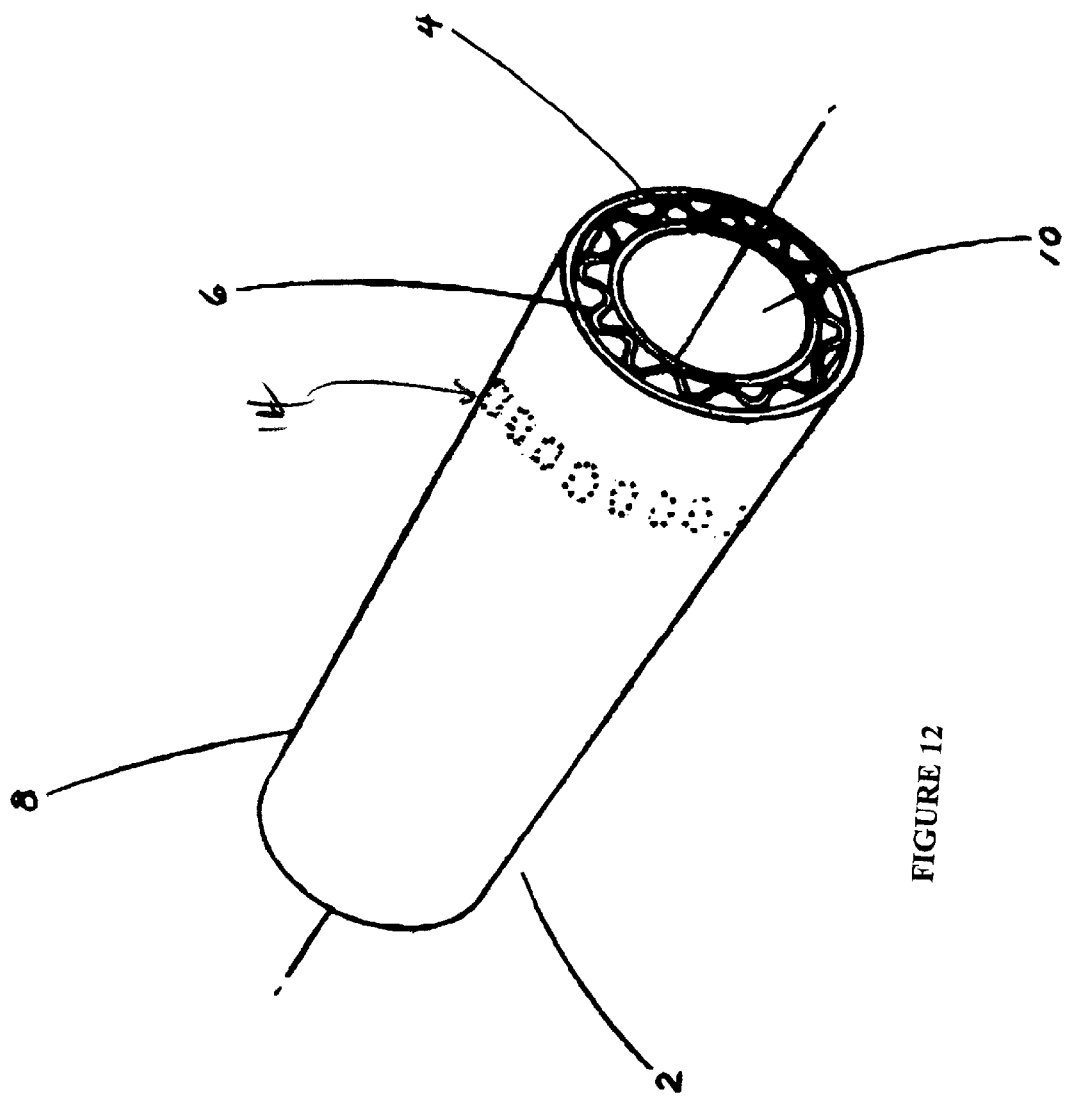

Structural member 2 can be made crushable by any manner in the art. In one aspect of the invention, the structural members are made crushable by including at least one crushing initiator (or initiator) adjacent to (or in) portion 4, portion 6, and/or portion 8. For example, as depicted in FIG. 12, the at least one initiator 14 can be incorporated in outer portion 8. However, the at least one initiator can be incorporated in inner portion 4, intermediate portion 6, and/or outer portion 8, as well as between these portions.

The initiator controls the location where, when an external load is applied, structural member 2 begins to deform. Often, the structural member resists impacts along its longitudinal axis. By including an initiator, the structural member of the present invention absorbs the energy of the load by undergoing a localized crush where the initiator is located, in modes such as transverse shearing, lamina bending, or local buckling like monocell buckling, face wrinkling, or core-shear instability. Thus, the initiator leads to a localized crush of the member so the structural member does not fail at other places.

Any suitable initiator known in the art can be employed in the present invention, including those described in U.S. Pat. Nos. 4,742,889, 5,732,801, 5,895,699, and 5,914,163, the disclosures of which are incorporated herein by reference. The initiator can be placed at any location of structural member 2 depending on the desired characteristics including the crushing strength and crushing length. Preferably, the initiator is not located at the ends of structural member 2. More preferably, the initiator is placed at least about ½ inch to about 2 inches away from any end of structural member 2.

Multiple initiators can be placed along separate portions of member 2 to deform (and therefore crush) several locations. Multiple initiators can also be placed proximate one another at a single portion of member 2 to deform that selected location. The number of initiators can vary, depending on the desired crushing strength and desired crushing length.

The initiator(s) can be of various shapes, sizes, and configurations, but should be substantially similar to the configuration of portion 4, intermediate portion 6, and/or portion 8. The width of the initiator can vary depending on the expected load, the desired crushing strength, and the desired crush length. For example, the width can range from about 1/16 inches to about 1 inch, and is preferably about ½ inches. The shape of the initiator can also vary depending on the expected load, the desired crushing strength, and the desired crush length. Generally, the shape is similar to that portion of structural member 2 into which it is incorporated. Thus, the shape can vary from circular, to rectangular or triangular, to any polygonal shape.

Figure 13:
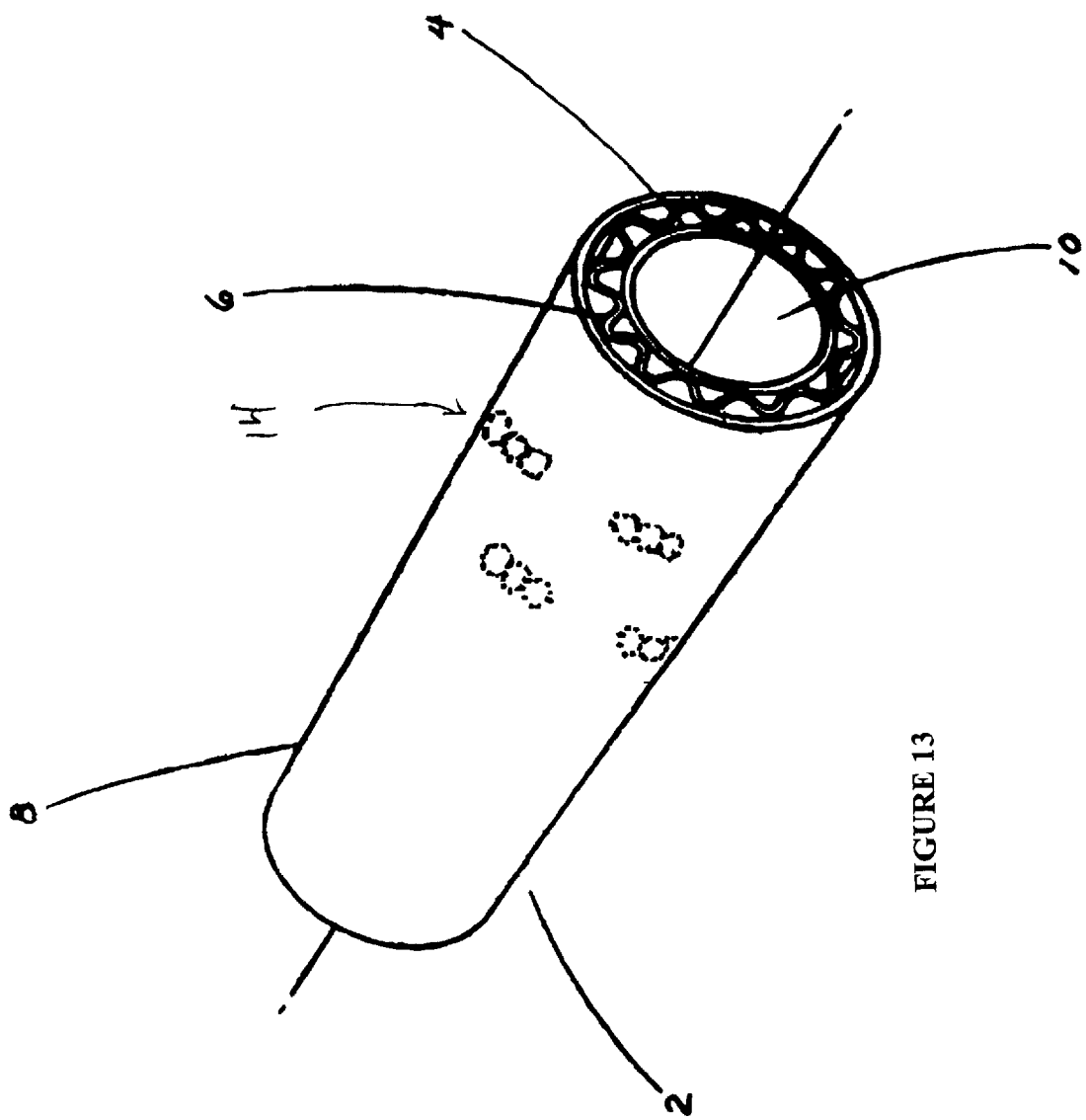
Figure 14:
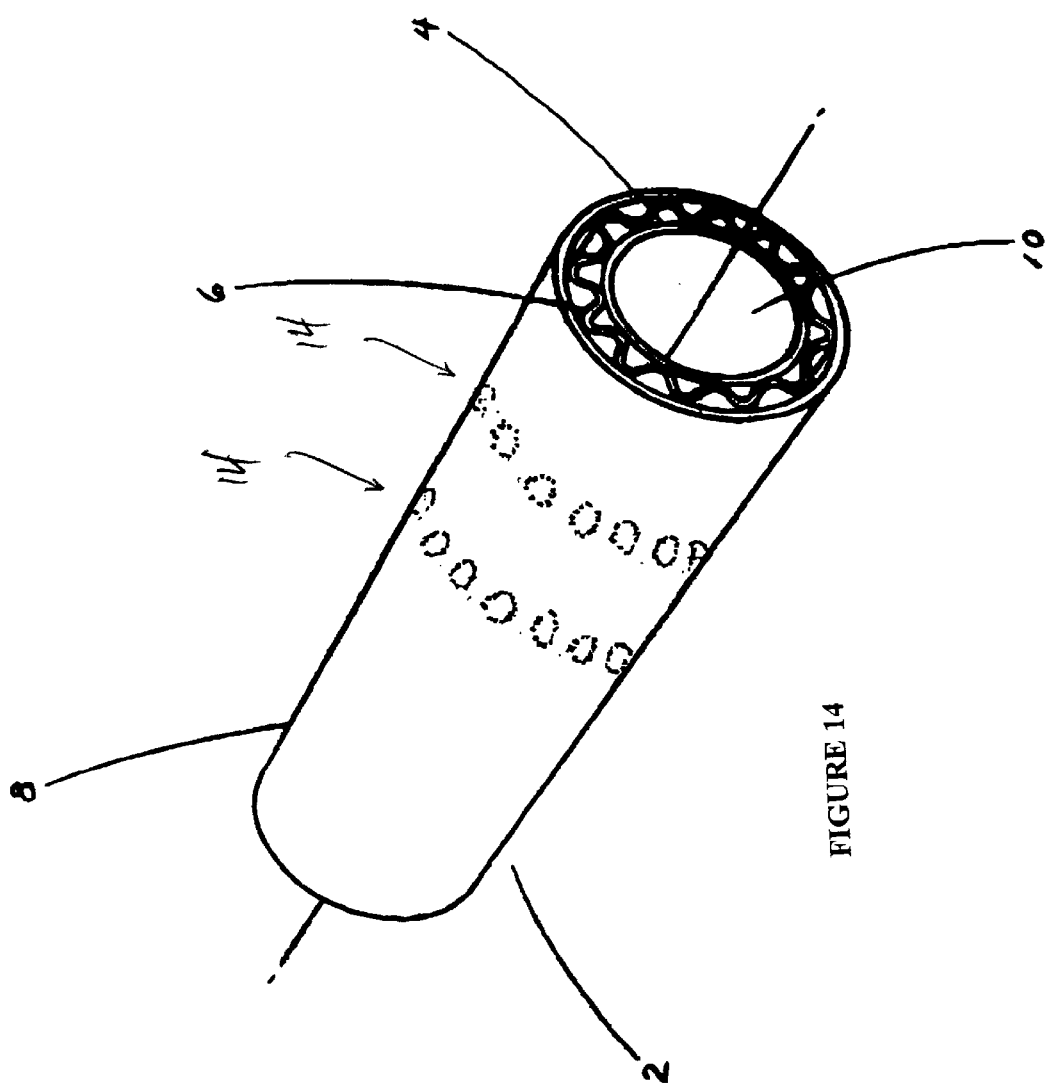

When multiple initiators are employed, they can be located in any desired location. In one aspect of the invention, the initiators can be either staggered or inline. The initiators can be inline, meaning that multiple initiators are aligned along the length or diameter of the structural member. The initiators can also be semi-staggered or fully staggered. In a semi-staggered position, the initiators are only partially aligned along a length or diameter of the structural member, e.g., they have overlapping positions (as illustrated in FIG. 13). In a fully staggered position, the initiators are not aligned along the length or diameter of the structural member, e.g., they have no overlapping positions (as illustrated in FIG. 14).

Figure 15:
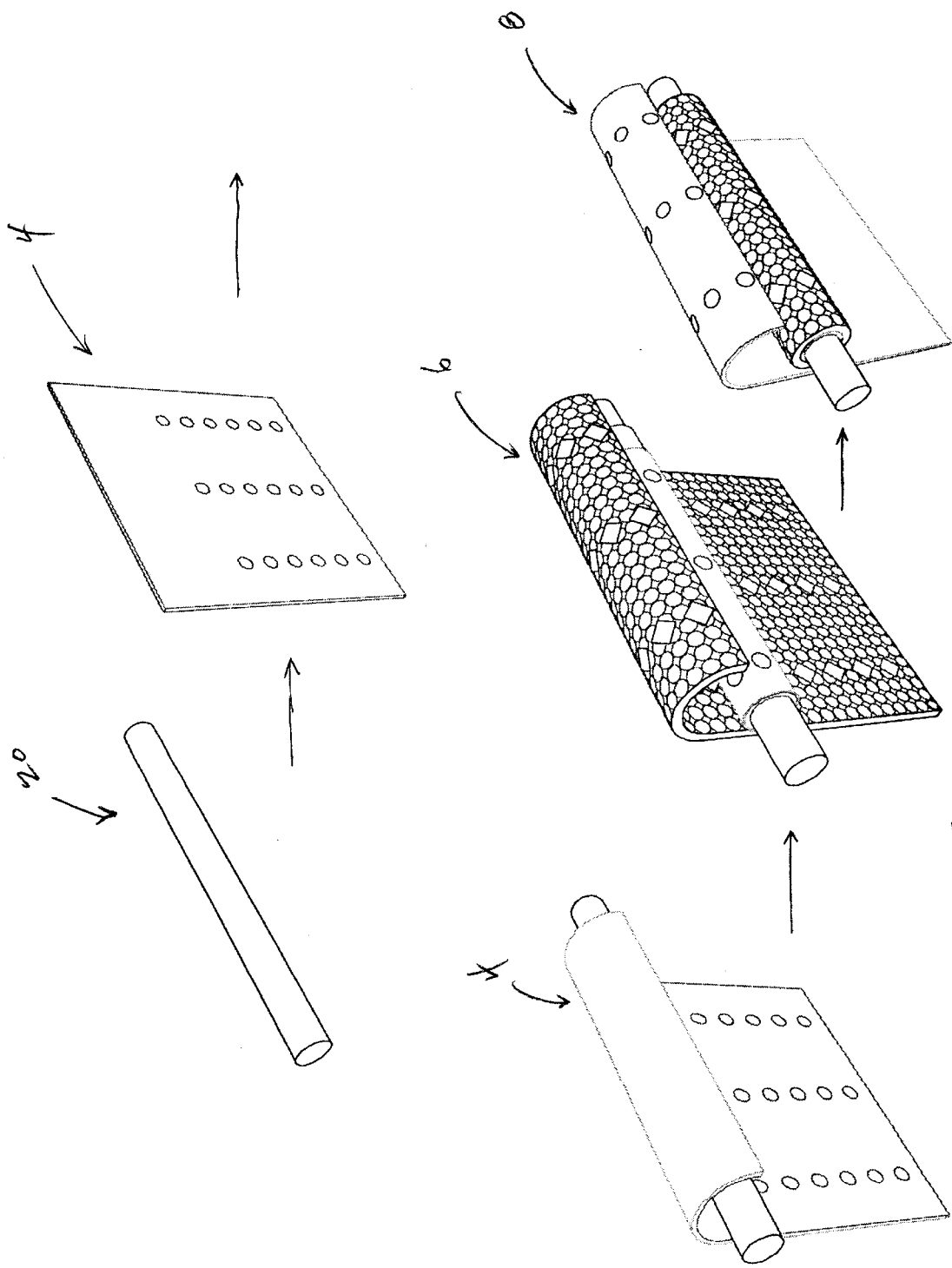

Any suitable material can be used for the initiator(s) of the present invention. Suitable materials used for the initiator can be any material which causes, as explained below, the respective inner and/or outer portion to deform. Suitable materials include as teflons, rubber bands, bromated films, release films, rubber films, polytetrafluoroethylene (PTFE) tape, papers, or a combination thereof It is believed that the initiator works because of the absence of a continuous layer in the inner, intermediate, and/or outer portion. Thus, the initiator could also be a gap or discontinuity (such as a stress riser) in the layer(s) of the inner, intermediate, and/or outer portion. The discontinuity could be a singular discontinuity such as a fold or irregularity, or plural discontinuities such as a row or column of cut-outs having any desired shape and size. For example, as illustrated in FIG. 15, a row of cut-outs can be located in a metal layer of the inner and/or outer portion, as well as the intermediate portion, so that when assembled, structural member 2 contains at least one initiator 14. In addition, when the impact load is an axial load, the initiator could be any material (or lack thereof) which operates as a local stress riser.

Figure 16:
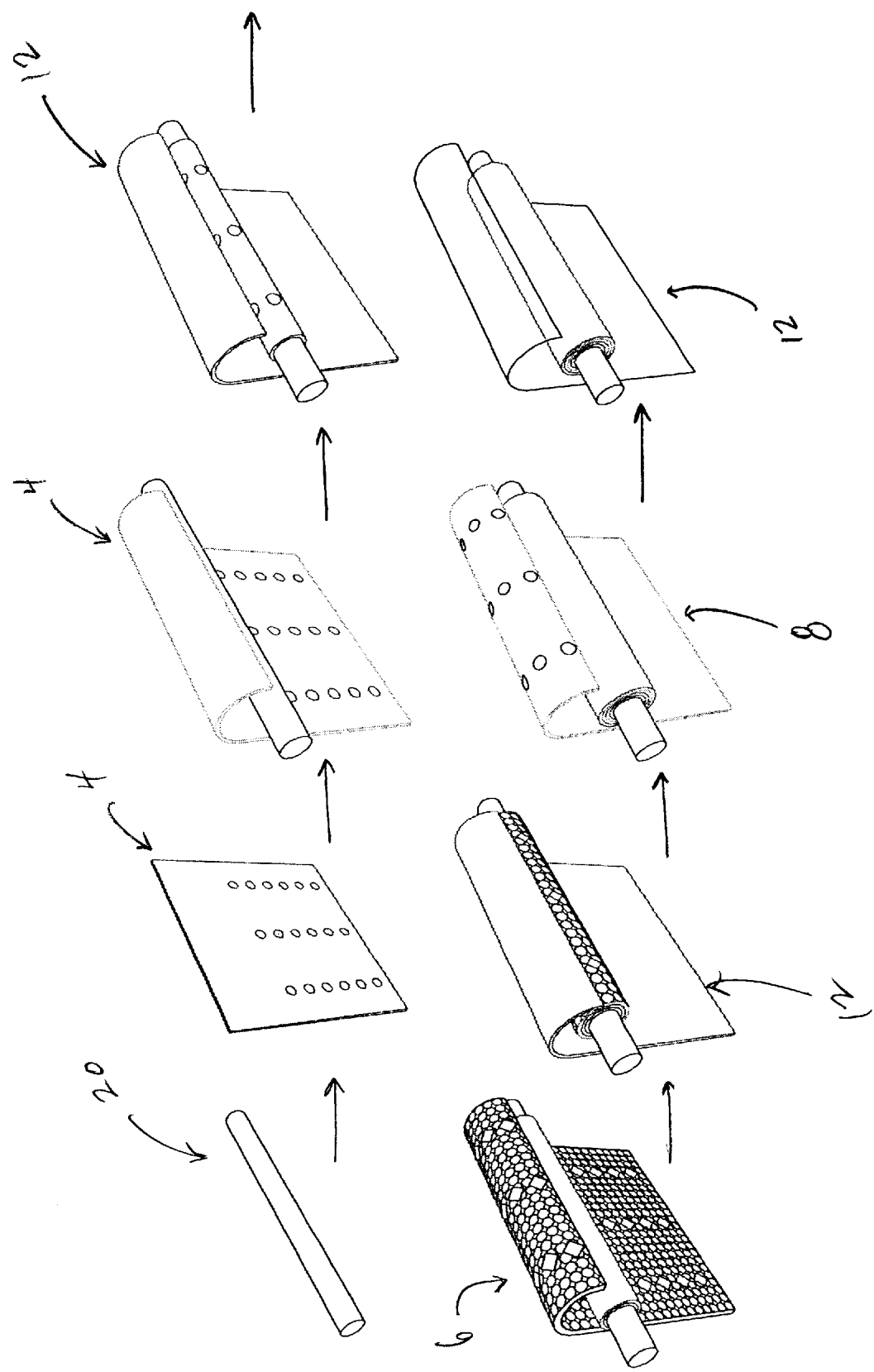

With structural members of the present invention, it may be required to damp out oscillations caused by varying mechanical loads, either axial loads, bending and shear loads, or torsional loads. Thus, as depicted in FIG. 16, at least one damping layer 12 can optionally be included in the structural member of the present invention. When included, at least one damping layer 12 is adjacent to (when there is only a single layer) or in (when there is a plurality of layers) inner portion 4 and/or outer portion 8. In addition, the at least one damping layer could be located within the voids of the RS of the present invention.

Numerous materials offer an efficient means of dissipating the energy (e.g., energy absorption) associated with such oscillations. One example of such energy absorption materials is a viscoelastic material. Suitable viscoelastic materials include any of those known in the art, including rubbers such as butyl rubber or natural rubber, plastics such as polyvinyl chloride (PVC), adhesives of various polymers materials including epoxy-based materials, silicones, or polyurethane. See, for example, U.S. Pat. Nos. 5,342,465, 5,250,132, 5,419,416, and 5,655,976, the disclosures of which are incorporated herein by reference. Preferably, 3M™ VHB™ Tape is used as the ate least one damping layer(s) in the present invention. The material, thickness, and number of layers comprising at least one damping layer 12 are selected for optimum damping at the expected temperature and frequency of vibration.

The present invention can be made by any suitable process which provides the structure of structural member 2. Suitable process for making the composite layer(s) include any processes known in the art, such as thermoforming, bladder or resin transfer molding, or inflatable mandrel processes, as described in U.S. Pat. Nos. 5,225,016, 5,192, 384, 5,569,508, 4,365,952, 5,225,016, 5,624,519, 5,567,499, and 5,851,336, the disclosures of which are incorporated herein by reference. Another suitable process is a vacuum bagging process, such as described in U.S. Pat. No. 5,848, 767, the disclosure of which is incorporated herein by reference. Other suitable processes are a filament winding process or sheet or tube rolling (also known as roll wrapping). See, for example, U.S. Pat. Nos. 5,632,940, 5,437,450, 4,365,952, 5,624,529, 5,755,558, 4,885,865, 5,332,606, 5,540,877, 5,840,347, and 5,914,163, the disclosures of which are incorporated herein by reference.

In the filament winding process, filaments of the desired material are dispersed in a matrix of binder material and wound about any suitable substrate, such as a mandrel assembly, with a shape generally corresponding to the desired shape (core region 10) of structural member 2. Any suitable mandrel, including those described in U.S. Pat. Nos. 5,795,524, 5,645,668, 5,192,384, 5,780,075, 5,632,940, 5,817,203, and 5,914,163, the disclosures of which are incorporated by reference, can be employed in the present invention. The substrate or mandrel must have sufficient strength, desired shape, and be able to withstand the processing conditions for making the structural member. Suitable mandrels include those made of metals like steel and aluminum, polycarbonate, thermoplastic, or RRMM materials. The mandrels may be solid or hollow.

The filaments are wound over the mandrel and are reciprocally displaced relative to the mandrel along the longitudinal or winding axis of the mandrel to build portion 4. Additional portions, structures, or layers, such as additional metal or composite layers, can be added as described above or as known in the art.

Figure 5:
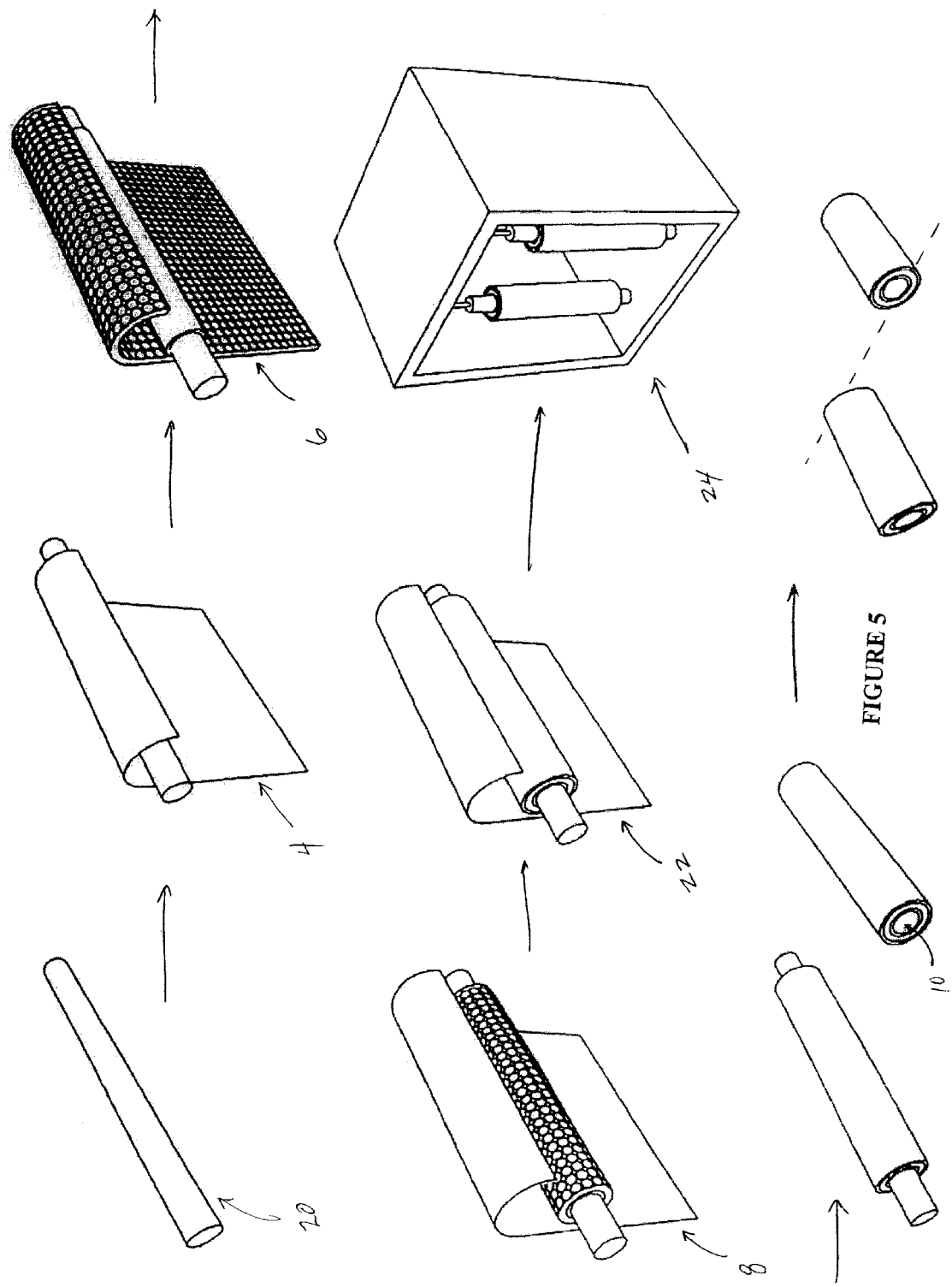

Preferably, the present invention employs a tube rolling (also known as roll wrapping) process for making the structural member of the present invention. One exemplary tube rolling process is illustrated in FIG. 5. The tube rolling process employs discrete sheet(s) of the metal-containing material or sheet(s) (or plies or laminates) of the desired composite material rather than filaments. The sheet(s) is interleaved, wrapped, or rolled over a mandrel assembly such as at least one mandrel 20. If desired, a release film can be applied to the mandrel prior to rolling any materials thereon. When more than one sheet is employed, the sheets can be stacked as illustrated in FIG. 2—prior to or during the rolling process—by hand or by any suitable mechanical apparatus, with the fibers of the composite material oriented in the desired orientation. When a continuous metal sheet is used, there is no need for such a stacking operation. After forming inner portion 4, the material comprising intermediate portion 6 is placed, preferably by wrapping or rolling, on inner portion 4 by any suitable human or mechanical apparatus. The roll wrapping process is then resumed to apply the material of outer portion 8. Further details about roll wrapping processes are described in *Engineered Materials Handbook, Volume 1: Composites*, ASM International, pp. 569–574 (1987), the disclosure of which is incorporated herein by reference. Additional layers or materials can be added over outer portion 8, if desired, in a similar manner or as known in the art.

Figure 6:
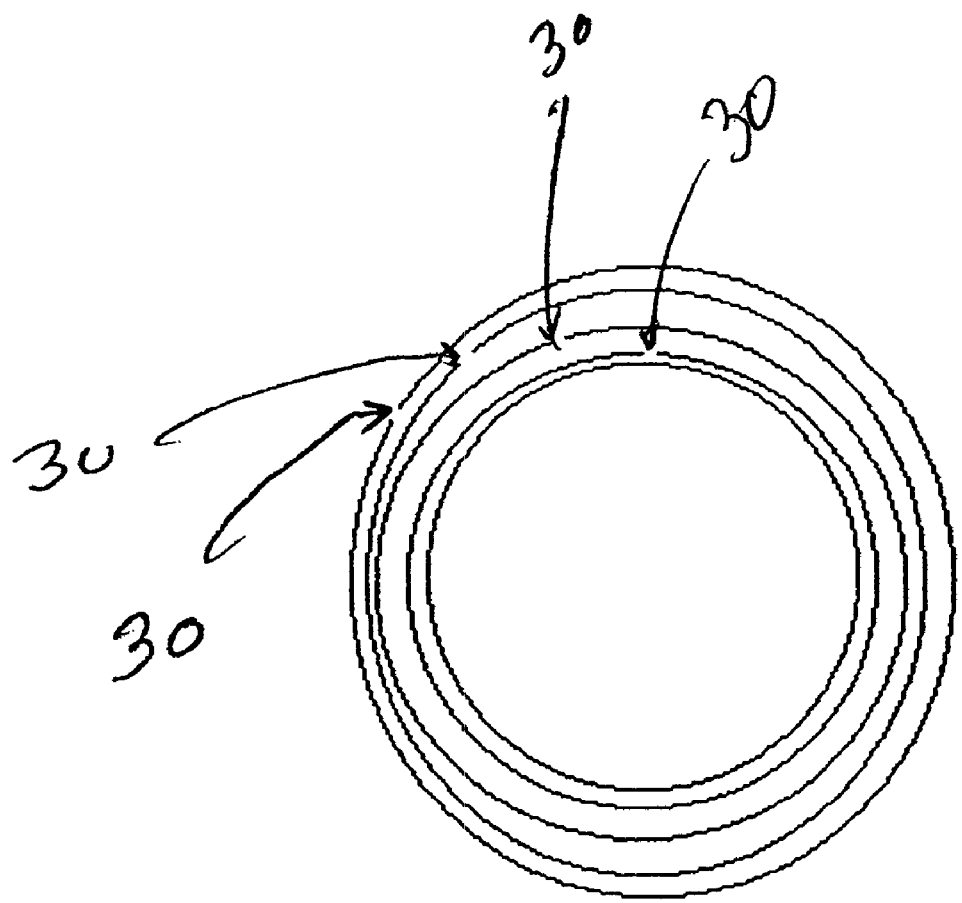

The layers of the individual portions (inner, intermediate, and outer) can be cut and/or patterned such that when roll wrapped, the ends of individual sheet(s) substantially abut when rolled, thereby forming a butt joint 30. Preferably, the butt joint formed by the ends of any single sheet is staggered from the butt joint formed by the ends of an adjacent sheet, as illustrated in FIG. 6. Of course, when a continuous metal sheet is rolled, no butt joint occurs.

Inner portion 4 and outer portion 8 may be formed using different methods. For example, inner portion 4 can be formed by filament winding and outer portion 8 by roll wrapping, or vice versa. In this aspect of the invention, inner portion 4 may be fully cured prior to the application of intermediate portion 6. Similarly, inner portion 4 and intermediate portion 6 may be applied and cured together prior to the application of outer portion 8. Other methods known in the art, such as those described above, could also be combined with roll wrapping to make the structural members by performing discrete steps by different methods. For example, inner portion 4 could be formed using the filament winding process, intermediate portion 6 and outer portion 8 could be formed using the roll wrapping process, and then this intermediate structure could be constrained using a vacuum bagging process.

If desired, a bonding agent can be placed between successive layers of portions 4, 6, and/or 8. The bonding agent can be placed on selected areas only, or in a pattern such as in rows and/or columns, or over entire areas of the layer(s)/portion(s). Any suitable agent which helps bond the layers and is compatible with all of the processes employed to make structural member 2 can be employed, including glues, curing agents, adhesive materials, or a combination thereof. See, for example, U.S. Pat. No. 5,635,306, the disclosure of which is incorporated herein by reference. The bonding agent can be applied by hand or mechanical apparatus prior to, during, or after the assembly of the respective portion on the substrate.

Where portions 4, 6, and 8 are successively layed up in an uncured (e.g. B-stage state), the structure has outer portion 8 overlying intermediate portion 6, which overlies inner portion 4, which overlies the mandrel. If necessary to better bond and connect inner portion 4, intermediate portion 6, and outer portion 8 together, the intermediate structure formed by these portions can be constrained. The intermediate structure can be constrained by applying a suitable compressive force. This can be done using any suitable means including compressive dies or molds, vacuum bagging, or by using a suitable constraining means, e.g., by placing it in a plastic or metal mold, or by applying a suitable shrink-wrap tape(s) 22 or tube made of nylon, silicone, or polypropylene. During the curing process described below, the compressive means (e.g., the shrink-wrap tape or tube) applies suitable compressive force by physical or chemical change so that the materials of structural member 2 contact each other. When the RMM is used in the inner and/or outer portion of the present invention, the compressive force squeezes out excess resin during this curing process. See, for example, U.S. Pat. Nos. 5,600,912 and 5,698,055, the disclosures of which are incorporated herein by reference.

Moreover, if it is still necessary to better bond and connect the materials in the intermediate structure, they can undergo a suitable chemical reaction. For example, when inner portion 4 and/or outer portion 8 comprise a curable material (e.g., B-stage epoxy prepreg), the intermediate structure can be cured by any suitable means 24, such as an oven curing by applying heat and/or pressure or using an ultraviolet (u.v.) or microwave curing. The necessary heat and/or pressure depend on the size of the mandrel assembly and the materials used in structural member 2. During the curing process, the shrink-wrap tape or tube applies suitable compressive force. When the RMM is used in the inner and/or outer portion of the present invention, the compressive force squeezes out excess resin during this curing process.

Figure 7:
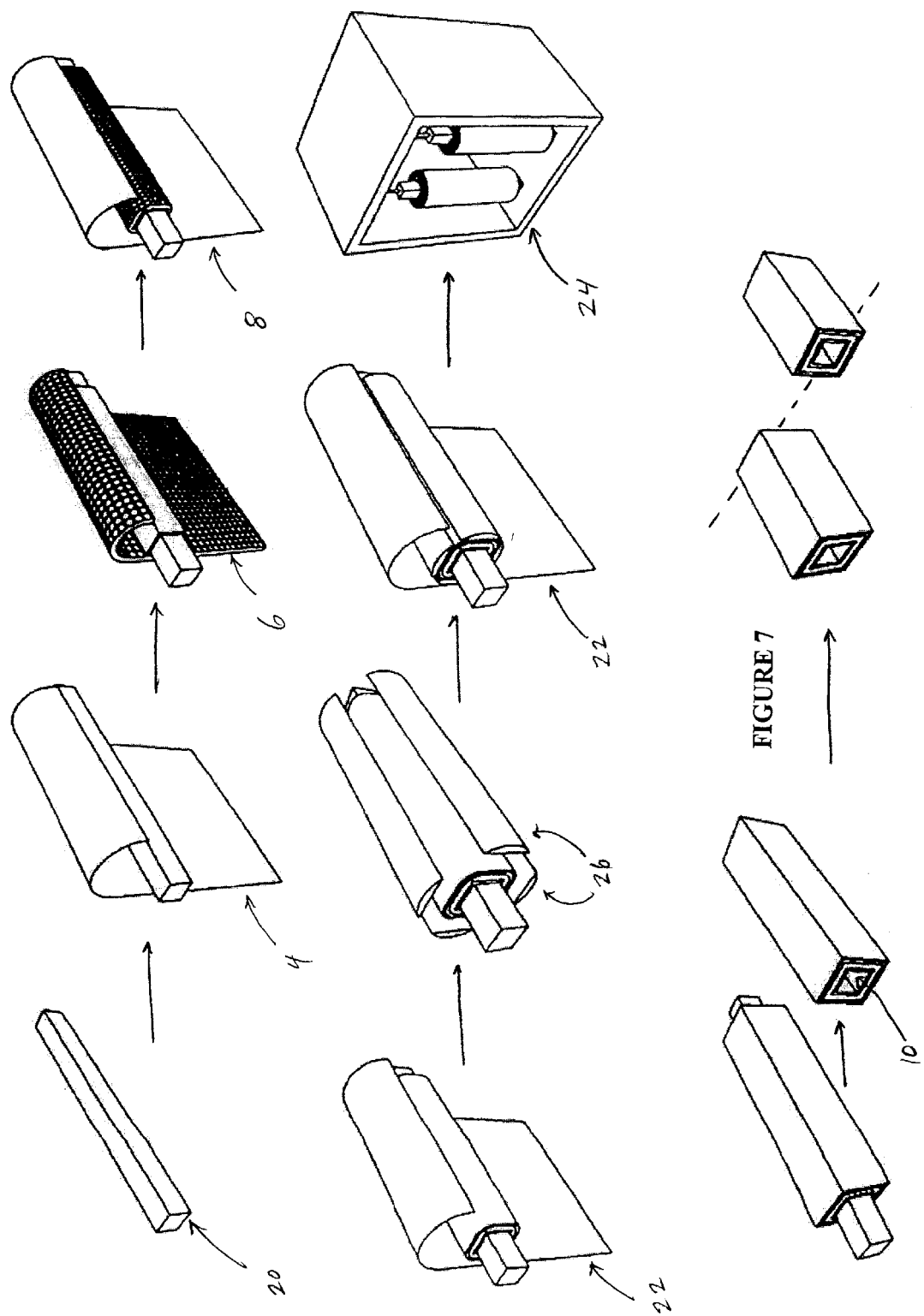

The above process can be modified for structural members not having a substantially circular cross-section, including those with outer diameters having at least one flat area or area where the degree of curvature is substantially different from other surfaces of structural member 2. Examples of such structural members are illustrated in FIG. 4. As illustrated in FIG. 7, where the outer diameter has at least one relatively flat area, the shrink-wrap material (and accompanying compressive force) applied to the intermediate structure may not be uniform. Thus, bonding and connecting the materials to one another may not be uniform and, therefore, might impair the integrity of structural member 2. To more uniformly bond and connect such materials, at least one pressure distributor 26 is placed over the relatively flat areas of outer portion 8 prior to applying the shrink-wrap material. The pressure distributors "distribute" the applied compressive force more evenly to such flat areas, allowing a more uniform compressive force to all areas of the intermediate structure.

Any suitable shape of pressure distributors which evenly distribute the applied compressive force to the intermediate structure can be employed in the present invention. Exemplary shapes of the pressure distributors include substantially semicircular shapes (which provide a substantially circular outer surface) and T-shaped distributors where the flat end of the "T" abuts (and matches in size) the flat area of the intermediate structure and the long-end of the "T" extends outwards. Other shapes and configurations, including single components rather than plural components, could be employed provided they evenly distribute the compressive force over the flat area(s). For the structural member 2 like the one illustrated in FIG. 4, substantially semicircular pressure distributors 26 are depicted in FIG. 7. The pressure distributors of the present invention can be made of any suitable material that will maintain its shape when subjected to the compressive force, such as aluminum, steel, and silicone. Preferably, aluminum is employed as the material for the pressure distributor.

The shrink-wrap material can be placed under and/or over the pressure distributor(s). The shrink-wrap materials underlying the pressure distributors pressurize the corners, as well as keeping the pressure distributors from sticking to the intermediate structure. The shrink-wrap materials overlying the pressure distributors pressurize the flat areas.

Figure 11:
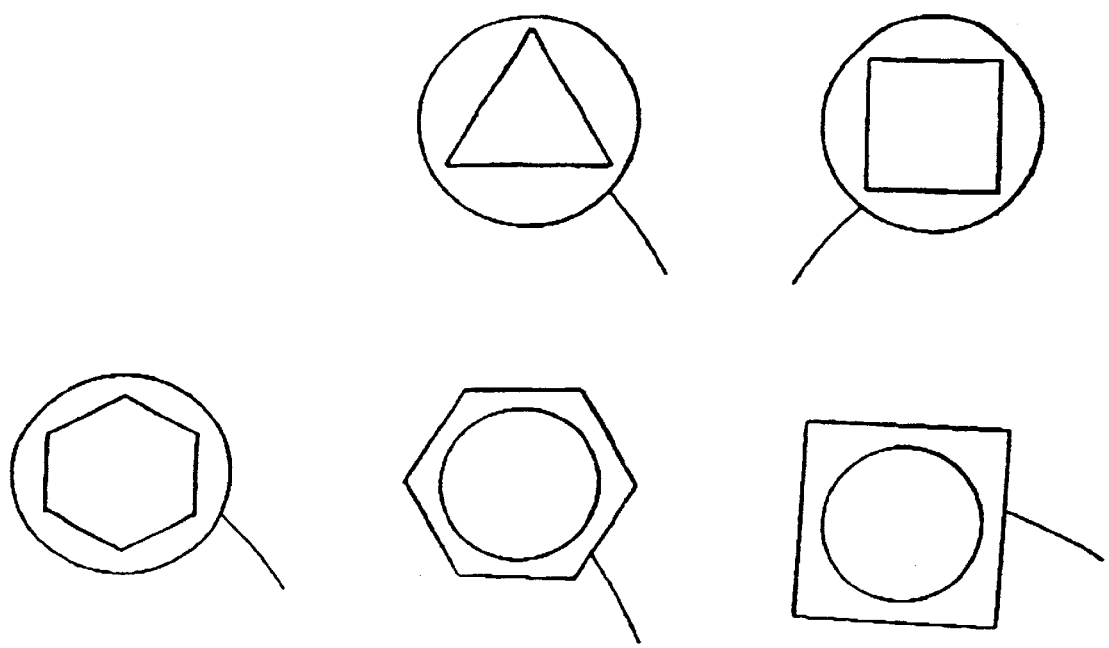

The above process can be also be modified for structural members where the inner and outer portion do not have the same shape, such as those depicted in FIG. 11. Any suitable process modification which manufactures differently-shaped inner and outer portions can be employed in the present invention. The following two modifications to the above process demonstrate this concept. Other modifications could be envisioned, even though not demonstrated below.

Figure 8:
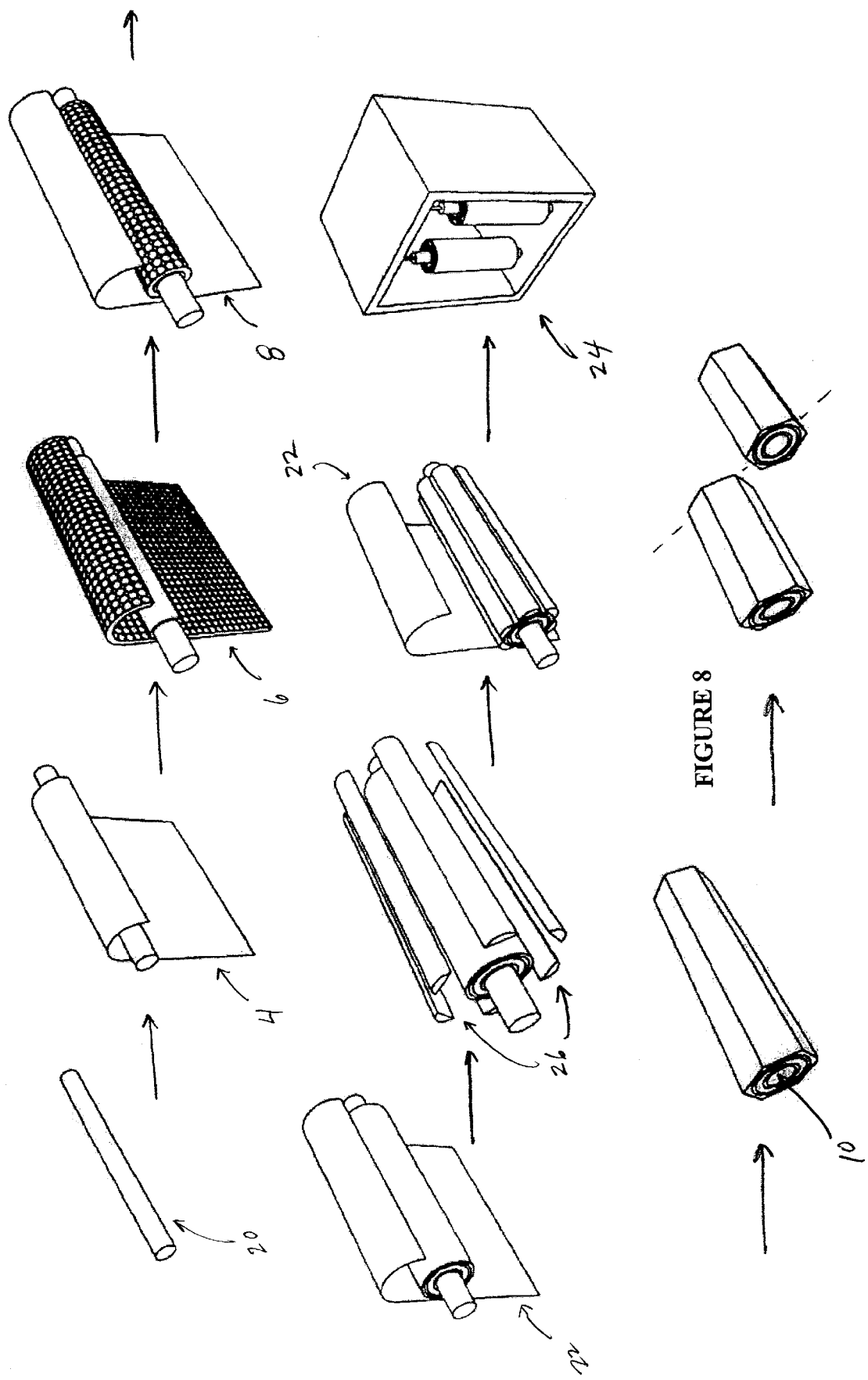

First, the inner portion can have a substantially circular cross-section and the outer portion a non-circular cross-section. In such an instance, and as shown in FIG. 8, the process for making a circular-shaped structural member is followed as described above. To change the shape of the outer portion, a number of pressure distributors are placed over the circular-shaped outer portion prior to the constraining and curing stages. The number of pressure distributors used corresponds to the number of flat sides desired, e.g., four for a square, six for a hexagon, etc . . . The process as noted above is then continued for the constraining and curing stages. During the constraining and curing process, the circular outer shape is changed to flat sides of the desired polygonal shape by the pressure exerted via the pressure distributors.

Figure 9:
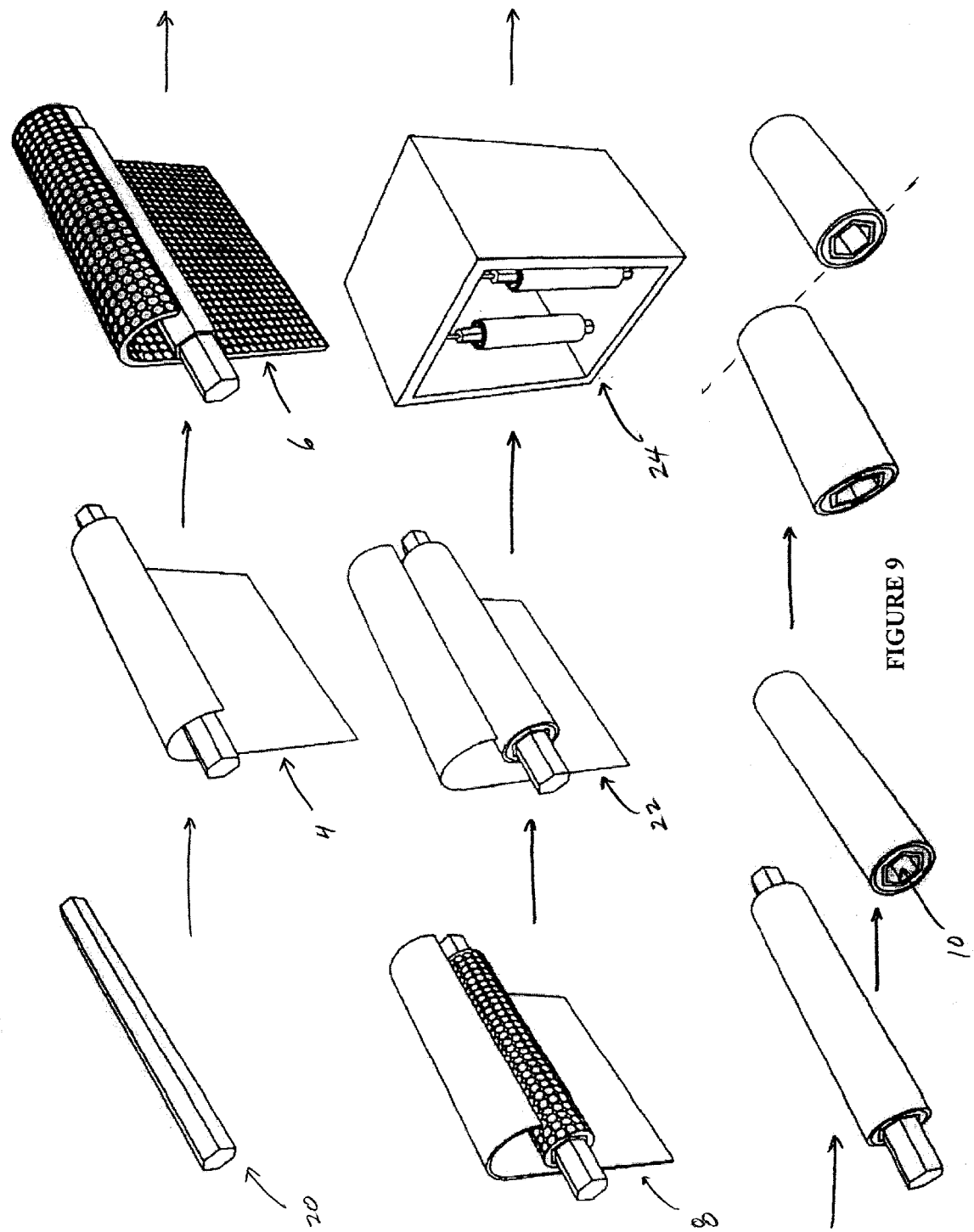

Second, the inner portion can have a substantially polygonal shape (i.e, square) and the outer portion a substantially circular shape. In this aspect of the invention as depicted in FIG. 9, the process for making a square-shaped structural member is followed as described above. To change the shape of the outer portion, the pressure distributors which are normally placed over the outer portion prior to the constraining and curing stages are omitted. Thus, the square-shaped outer portion is just wrapped with the constraining means. The process as noted above is then continued for the constraining and curing stages. During the constraining and curing process, the outer shape is changed to a substantially circular shape by the pressure exerted via the constraining means.

When used, the constraining means are then removed from the intermediate structure. For the plastic or metal mold, the mold is opened and removed. The shrink-wrap tape or tube may have reacted during the curing process to form a thin shell and, if desired, may be removed by hand or by a mechanical apparatus. When used, the pressure distributors are also removed.

In another aspect of the invention, the constraining means can be left on the outer portion either temporarily or permanently. For example, the shrink-wrap tape could be left on the structural member in the form as a thin shell for protection during shipping and then removed later. In another example, the shrink-wrap tape could be left on the structural member permanently as a protective coating.

Through the constraining and curing processes described above, the inner portion and the outer portion are chemically attached and/or or connected to the intermediate portion. Preferably, the materials of the inner and outer portion both chemically bond to the material of the intermediate portion, thus forming a substantially permanent physical bond.

Next, the substrate or mandrel may be removed from structural member 2 to form core region 10. The mandrel may be removed by any suitable process, including any known in the art which safely removes the mandrel without adversely impacting structural member 2, such as those disclosed in U.S. Pat. No. 5,900,194 and 5,306,371, the disclosures of which are incorporated herein by reference. If desired, core region 10 can be filled by any desired material as known in the art.

The mandrel can be either a removable mandrel or an integral mandrel. A removable mandrel is a mandrel that, as described above, is used in the roll wrapping process and then removed to create interior 10. An integral mandrel is a mandrel which becomes part of structural member 2 and is not removed. Thus, the mandrel remains in core region 10 and becomes a part of structural member 2.

When using an integral mandrel, the structural member 2 and the process for making that member are modified from the above description. In this aspect of the present invention, the intermediate portion is provided over the integral mandrel, and then the outer portion is provided over the intermediate portion. The structural member then follows the processing described above, with the exception that the integral mandrel is not removed. Thus, the integral mandrel can serve as the inner portion. If desired, an inner portion could still be included over the integral mandrel, yielding a structural member with an integral mandrel, an inner portion, an intermediate portion, and an outer portion.

At least one initiator 14 may be included in the present invention by any suitable method, including those known in the art. If only one layer is employed for portion 4, intermediate portion 6, and/or portion 8, the initiator can be created under, in, or over that single layer. When more than one layer is employed for such portions, such an initiator(s) can, additionally or alternatively, be included between the layers making up the respective portion.

For example, when the initiator is a gap or discontinuity in portion 4, intermediate portion 6, and/or portion 8, the desired section of that portion can be removed or altered. Any gap or discontinuity is preferably, although not necessarily, formed in the material prior to the roll wrapping operation. The initiator can consist of rows or columns of cutouts of any desired shape and size, as exemplified in FIG. 15, in the respective material which have been removed by any suitable process known in the art, such as stamping. The desired configuration for the initiator is selected, the desired location(s) for deformation of the structural member are determined, and the initiator(s) is then placed by creating a gap or discontinuity in the respective layer(s) of portion 4, portion 6, and/or portion 8 either before or after the rolling operation.

As another example, when the initiator is similar to that illustrated in FIG. 12, the desired width of the initiator material can placed on the selected locations(s) of portion 4, intermediate portion 6, and/or portion 8. The initiator material could be placed by rolling or wrapping the initiator material under or on the respective inner, intermediate, and/or outer portion. Alternatively, the initiator material could be placed in or on the sheet(s) prior to the rolling or wrapping process, e.g., by manufacturing the sheet(s) with the initiator formed therein. The desired material and configuration for the initiator is selected, the desired location(s) for deformation of the structural member are determined, and the initiator(s) is then placed under, over, or within the layer(s) of portion 4, 6, and/or 8 either before or after the rolling operation.

At least one damping layer 12 can be incorporated in portions 4, 6, and/or 8 of structural member 2 in any suitable manner. In one suitable manner, the desired materials are made in numerous thin layers and sealed between—or abutted adjacent to—layers of stiffer elastic materials, such as between individual layers of inner portion 4 and outer portion 8. In another suitable manner, the vibration damping material could be incorporated into the voids of the ribbed structure of intermediate portion 6. Other methods of including a damping layer in materials are known in the art. See U.S. Pat. Nos. 5,342,465, 5,250,132, 5,419,416, and 5,655,976, the disclosures of which are incorporated herein by reference.

If only one layer is employed for inner portion 4 and/or outer portion 8, then the damping layer is created under or over that single layer. When more than one layer is employed for inner portion 4 and/or outer portion 8, the damping layer can be included between the layers comprising the respective inner or outer portion. In either case, the damping layer is included by selecting the desired material and then placing, preferably by wrapping or rolling, the damping layer under or over the desired layer of the respective inner and/or outer portion. If necessary, successive layer(s) of the damping material can be used to make the at least one damping layer 12.

Figure 10:
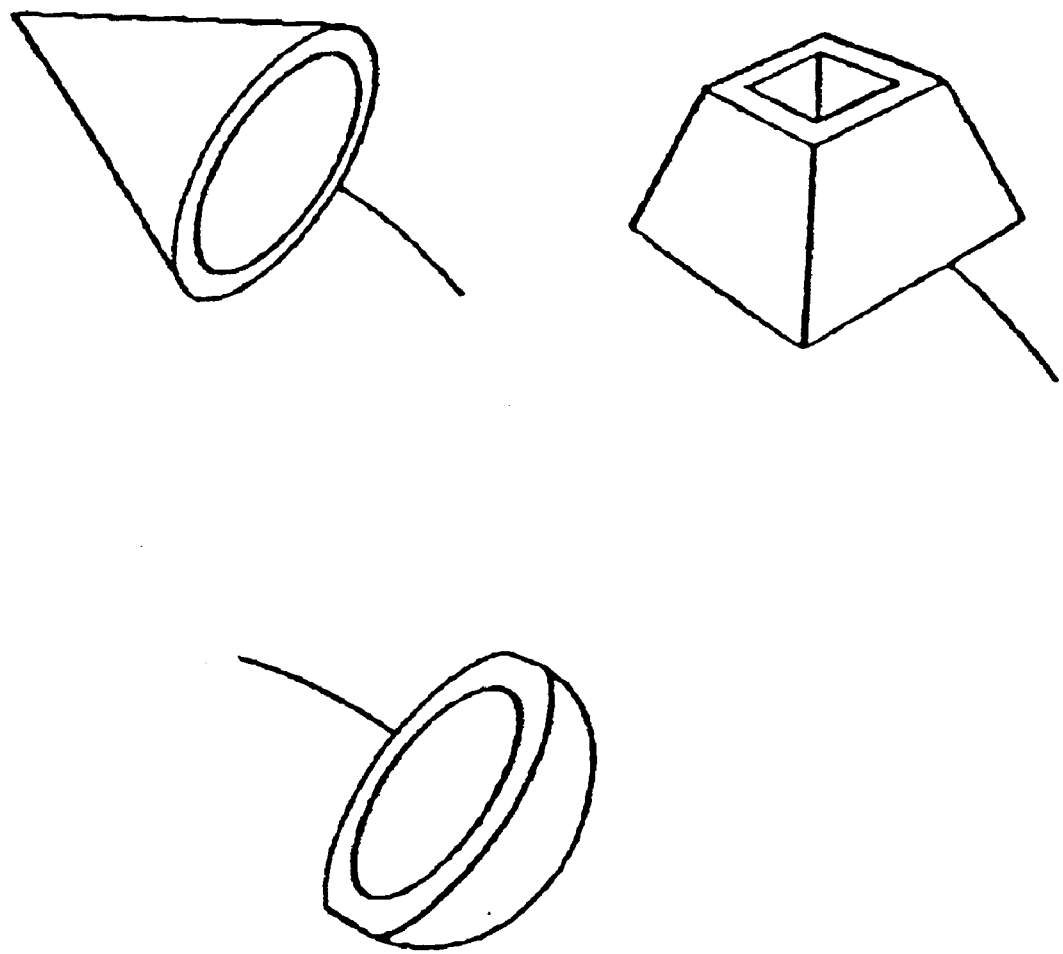

Once formed, the structural members of the present invention can be modified or cut for any desired use. For example, the structural members illustrated in FIGS. 5 and 7–9 have been cut in half along its length to provide two structural members. Likewise, the structural members could be cut along its length to provide any number of members with the desired length(s). Numerous shapes and configurations can be made using by cutting along any dimension of the structural members, especially when combined with the broadest aspects of the processes of the present invention. A few examples of such shapes and configurations are shown in FIG. 10. If desired, at least one structural component such as a bracket, fastener, coupler, cap, or the like, could be provided on structural member 2, for example, on the ends thereof Roll wrapping is the preferred method for making the structural members of the present invention. The other methods described above, however, could be combined with roll wrapping to make the structural members by, in one aspect of the invention, performing discrete steps by different methods. For example, inner portion 4 could be formed using the filament winding process, the intermediate portion 6 and the outer portion 8 could be formed using the roll wrapping process, and then the intermediate structure could be constrained using the vacuum bagging process.

The structural member of the present invention has numerous uses such as a tie, torsion-bar, tube, beam, column, cylinder and the like and can be used in numerous industries. Primarily, the structural member can be used whenever a lightweight, strong, cylindrical object is required. The structural member of the present invention can be used in the automotive, transportation, aerospace, and defense industries in applications such as airplane components, vehicle components such as tracks, trains, shipping containers, defense-related applications, recreational applications such as bikes, sail masts, shafts for golf clubs and racquets, or commercial applications such as bridges and buildings.

The following non-limiting examples illustrate the present invention.

EXAMPLE 1

A hollow, cylindrical structural member with a circular cross-section was made according to following process. A thin coat of a release material (Frekote 700NC or Axel EM606SL/SP) was applied to a 3 inch diameter aluminum mandrel with a length of 52 inches.

Two metal (aluminum) sheets with preapplied adhesive and a thickness of about 0.001 inch were pattern cut with measurements of about 38 inches in width and about 48 inches in length. In both sheets, about 0.25 inch diameter holes, about 1 inch apart, were punched about 2 inches away from the "side" end of the metal sheet. The holes were punched, leaving the first 10 inches from the leading end of the sheet (that end first wrapped onto the mandrel) without any holes and the remaining 28 inches with holes.

One of the metal sheets was then roll wrapped by hand onto the aluminum mandrel starting with the metal portion against the mandrel, e.g., so the adhesive material was on the top. After rolling, the metal sheet of the inner portion was four layers "thick" on the mandrel: the first layer contained those portions of the sheet with no punched holes and the least three layers having the punched holes.

Next, a honeycomb Hexcell Nomex® core with hexagonal shaped cells and a thickness of about 0.15 inches was measured and cut to dimensions of about 10 inches by about 48 inches. About 0.25 inch diameter holes, about 1 inch apart, were punched about 2 inches away from the "side" end of the honeycomb. This honeycomb core was then roll wrapped by hand on the first metal sheet, with the honeycomb core adjacent to the adhesive of the last layer of the first metal sheet.

The second metal sheet was then roll wrapped by hand starting with adhesive layer first, e.g., so that adhesive layer is adjacent to the honeycomb core on the outer surface. After rolling, the metal sheet of the outer portion was four layers "thick" on the mandrel: the first three layers having the punched holes and the last layer contained no punched holes. Both metal sheets were roll wrapped with the punched holes aligned.

Next, the resulting intermediate structure was shrink-wrapped. One layer of polyethylene-based shrink-wrap tape was roll wrapped by a shrink-wrapping machine using gauge number 150 on the resulting structure. Two layers of nylon-based shrink-wrap tape were then roll wrapped by a shrink-wrapping machine using gauge number 200.

After this wrapping process, the final structure was subjected to a curing process at about 250 degrees Fahrenheit for about 120 minutes during which the shrink-wrap tapes applied compressive pressure to the intermediate structure. After this curing process, the shell (formed by the shrink-wrap tapes during the curing process) was removed by hand with a knife. The mandrel was then removed from the center of the tube by hand and the tube was cut to the desired length.

EXAMPLE 2

A hollow, cylindrical structural member with a circular cross-section was made according to following process. A thin coat of a release material (Frekote 700NC or Axel EM606SL/SP) was applied to a 3 inch diameter aluminum mandrel with a length of 52 inches.

Two metal (aluminum) sheets with preapplied adhesive and a thickness of about 0.001 inch were pattern cut with measurements of about 38 inches in width and about 48 inches in length. Two sheets of 10"×48" vibration damping tape (3M VBH vibration damping tape) were then cut to size and laid over an end portion of the metal sheets.

The first metal sheet with preapplied adhesive and the vibration damping material was then roll wrapped by hand onto the aluminum mandrel starting with the vibration damping layer portion first, e.g., so the metal sheet was adjacent to the mandrel and vibration damping material was on the top. After rolling, the metal sheet of the inner portion was four layers "thick" on the mandrel: the first layer contained those portions of the sheet with vibration damping material and the last three layers having no vibration damping material.

Next, a honeycomb Hexcell Nomex® core with hexagonal shaped cells and a thickness of about 0.15 inches was measured and cut to dimensions of about 10 inches by about 48 inches. This honeycomb core was then roll wrapped by hand on the first metal sheet, with the honeycomb core adjacent to the adhesive of the last layer of the first metal sheet.

The second metal sheet with preapplied adhesive and vibration damping material was then roll wrapped by hand starting with adhesive layer first, e.g., so that adhesive layer was adjacent to the honeycomb core and the vibration damping layer was on the outer surface. After rolling, the metal sheet of the outer portion was four layers "thick" on the mandrel: the first three layers contained no vibration damping material and the last layer contained the vibration damping material.

Next, the resulting intermediate structure was shrink-wrapped. One layer of polyethylene-based shrink-wrap tape was roll wrapped by a shrink-wrapping machine using gauge number 150 on the resulting structure. Four 2-inch diameter semicircular or 2-inch "T" pressure distributors were placed on the flat sides of the square shaped outer portion. Two layers of nylon-based shrink-wrap tape were then roll wrapped by a shrink-wrapping machine using gauge number 200.

After this wrapping process, the final structure was subjected to a curing process at about 250 degrees Fahrenheit for about 120 minutes during which the shrink-wrap tapes applied compressive pressure to the intermediate structure. After this curing process, the shell (formed by the shrink-wrap tapes during the curing process) was removed by hand with a knife. The mandrel was then removed from the center of the tube by hand and the tube was cut to the desired length.

EXAMPLE 3

A hollow, cylindrical structural member with a circular cross-section can hypothetically be made according to following process. A thin coat of a release material (Frekote 700NC or Axel EM606SL/SP) is applied to a circular aluminum mandrel with a diameter of about 2½ inches and a length of about 52 inches.

Four B-stage prepreg laminate sheets containing anisotropic glass fibers in a B-stage epoxy-based resin are cut with measurements of about 7.5 to 8.6 inches in width and about 48 inches in length. The sheets each have different widths according to their location in the lay-up on the mandrel. It is preferable to have each layer sufficiently wide to form closely-spaced butt joints when the layer is wrapped around the mandrel.

Four individual laminate sheets or plies are then overlaid in an overlapping manner so the fibers in successive sheets are symmetric and balanced at angles of ±15 degrees from the longitudinal axis of the mandrel and the butt joints of successive layers do not overlap. The air between the stacked sheets is removed by using a roller or other suitable device. The stacked prepreg sheets are then roll wrapped by hand around the aluminum mandrel with a butt joint to form inner portion 4.

Next, intermediate portion 6, comprising a honeycomb of Hexcel Nomex® core with hexagonal-shaped cells and a thickness of about 0.15 inches, is measured and cut to dimensions of about 8 inches by about 48 inches. This honeycomb core is then roll wrapped by hand on the first set of stacked prepreg sheets (inner portion 4).

One metal (aluminum) sheet with a thickness of about 0.001 inch is pattern cut with measurements of about 30 inches in width and about 48 inches in length. A sheet of adhesive with a size similar to the metal sheet is then cut (30" by 48") and laid uniformly over the metal sheet.

The metal sheet with adhesive is then roll wrapped by hand starting with adhesive layer first, e.g., so that adhesive layer is adjacent the honeycomb core. After rolling, the metal sheet of the outer portion is four layers "thick" on the mandrel.

Next, the resulting intermediate, uncured structure was shrink-wrapped. One layer of polyethylene-based 150 gauge shrink-wrap tape having a width of approximately 1 inch was roll wrapped by a shrink-wrapping machine. Another layer of 200 gauge nylon-based shrink-wrap tape was then roll wrapped by a shrink-wrapping machine.

After this wrapping process, the final structure is cured at about 250 degrees Fahrenheit for about 120 minutes during which the shrink-wrap tapes applies compressive pressure to the intermediate structure as it is cured. After this curing process, the shell (formed by the shrink-wrap tapes during the curing process) is removed by hand with a knife. The mandrel is then removed from the center of the tube by hand and the tube is cut to the desired length.

Having described the preferred embodiments of the present invention, it is understood that the invention defined by the appended claims is not to be limited by particular details set forth in the above description, as many apparent variations thereof are possible without departing from the spirit or scope thereof.

I claim:

1. A contoured structural member, comprising:
    an inner section having a continuous plurality of contoured layers comprising a metal-containing material;
    an outer section having a continuous plurality of contoured layers comprising a metal-containing material; and
    at least one intermediate layer having a honeycomb structure connecting the inner section and the outer section.

2. The structural member of claim 1, wherein the structural member has a closed configuration.

3. The structural member of claim 1, wherein the inner section contains a layer comprising a composite material, the outer section contains a layer comprising a composite material, or the inner and outer sections contain a layer comprising a composite material.

4. The structural member of claim 1, wherein the metal-containing material comprises magnesium, aluminum, titanium, zinc, molybdenum, or alloys thereof.

5. The structural member of claim 4, wherein the metal-containing material is aluminum or an alloy thereof.

6. The structural member of claim 1, wherein the metal-containing material comprises iron, copper, nickel, carbon steel, stainless steel, alloy steel, tin, or alloys thereof.

7. The structural member of claim 6, wherein the metal-containing material is stainless-steel or an alloy thereof.

8. The structural member of claim 1, wherein the metal-containing material in the inner and outer sections are the same.

9. The structural member of claim 1, further comprising at least one layer or portion covering at least a portion of the outer section.

10. A contoured structural member, comprising:
    a plurality of contoured inner layers comprising a metal-containing material;
    a plurality of contoured outer layers comprising a metal-containing material; and
    at least one intermediate layer having a honeycomb structure connecting the plurality of inner layers and the plurality of outer layers;
    wherein the plurality of contoured inner layers is formed of a continuous sheet, the plurality of contoured outer layers is formed of a continuous sheet, or the plurality of inner contoured layers and the plurality of contoured outer layers are both formed from continuous sheets.

11. A method for making a contoured structural member, comprising:
    providing an inner section containing a layer comprising a metal-containing material;
    roll wrapping at least one intermediate layer over the inner section, the at least one intermediate layer having a honeycomb structure; and
    providing an outer section over the at least one intermediate layer, the outer section containing a layer comprising a metal-containing material; and
    connecting the inner and outer sections to the at least one intermediate layer;
    wherein the inner section contains a plurality of layers, the outer section contains a plurality of layers, or the inner and outer sections contain a plurality of layers.

12. The method of claim 11, further including providing the inner section and then removing the substrate after the connection.

13. The method of claim 12, including partially or completely filling the interior created by removing the substrate.

14. The method of claim 13, further including constraining the outer section when connecting the inner and outer section to the at least one intermediate layer prior to removing the substrate.

15. The method of claim 14, including constraining the outer section by roll wrapping at least one layer of a shrink-wrap material over the outer section.

16. The method of claim 15, including removing the at least one layer of the shrink-wrap material after the connection.

17. The method of claim 15, further including providing at least one pressure distributor over the outer section.

18. The method of claim 17, including providing a plurality of layers of shrink-wrap material with the at least one pressure distributor between two of said layers.

19. A method for making a contoured structural member, comprising:
    roll wrapping at least one inner layer comprising a metal-containing material over a substrate, wherein the at least one inner layer comprises a plurality of layers;
    roll wrapping at least one intermediate layer over the at least one inner layer, the at least one intermediate layer having a honeycomb structure;
    roll wrapping at least one outer layer over the at least one intermediate layer, the at least one outer layer comprising a metal-containing material; and
    connecting the at least one inner and outer layer to the at least one intermediate layer.

20. A method for making a contoured structural member, comprising:
    roll wrapping at least one inner layer comprising a metal-containing material over a substrate;
    roll wrapping at least one intermediate layer over the at least one inner layer, the at least one intermediate layer having a honeycomb structure, and
    roll wrapping at least one outer layer over the at least one intermediate layer, the at least one outer layer comprising a metal-containing material, wherein the at least one outer layer comprises a plurality of layers; and
    connecting the at least one inner and outer layer to the at least one intermediate layer.

21. A method for making a contoured structural member, comprising:
    roll wrapping at least one inner layer comprising a metal-containing material over a substrate;
    roll wrapping at least one intermediate layer over the at least one inner layer, the at least one intermediate layer having a ribbed structure; and
    roll wrapping at least one outer layer covering the at least one intermediate layer, the at least one outer layer comprising a metal-containing material;
    connecting the at least one inner and outer layers to the at least one intermediate layer; and
    removing the substrate;
    wherein the at least one inner layer contains a plurality of layers, the at least one outer layer contains a plurality of layers, or the at least one inner and outer layers contain a plurality of layers.

22. A method for making a contoured structural member, comprising:
    roll wrapping at least one inner layer comprising a metal-containing material over a substrate;
    roll wrapping at least one intermediate layer over the at least one inner layer, the at least one intermediate layer having a ribbed structure; and
    roll wrapping at least one outer layer covering the at least one intermediate layer, the at least one outer layer comprising a metal-containing material;
    constraining the at least one outer layer with a shrink-wrap material;
    connecting the at least one inner and outer layers to the at least one intermediate layer; and
    removing the shrink-wrap material and the substrate;
    wherein the at least one inner layer contains a plurality of layers, the at least one outer layer contains a plurality of layers, or the at least one inner and outer layers contain a plurality of layers.

23. A method for making a contoured structural member, comprising:
    roll wrapping at least one inner layer comprising a metal-containing material over a substrate;
    roll wrapping at least one intermediate layer having a honeycomb structure to be substantially contiguous with the at least one inner layer; and
    roll wrapping at least one outer layer to be substantially contiguous with the at least one intermediate layer, the at least one outer layer comprising metal-containing material;
    constraining the at least one outer layer with a shrink-wrap material;
    connecting the at least one inner and outer layers to the at least one intermediate layer; and
    removing the shrink-wrap material and the substrate;
    wherein the at least one inner layer contains a plurality of layers, the at least one outer layer contains a plurality of layers, or the at least one inner and outer layers contain a plurality of layers.

24. A contoured structural member made by the method comprising:
    providing at least one inner layer using a continuous sheet comprising a metal-containing material;
    roll wrapping at least one intermediate layer over the at least one inner layer, the at least one intermediate layer having a honeycomb structure; and
    providing at least one outer layer over the at least one intermediate layer, the at least one outer layer containing a continuous sheet comprising a metal-containing material; and
    connecting the at least one inner and outer layers to the at least one intermediate layer;
    wherein the at least one inner layer contains a plurality of layers, the at least one outer layer contains a plurality of layers, or the at least one inner and outer layers contain a plurality of layers.

25. A contoured structural member made by the method comprising:
    roll wrapping at least one inner layer using a continuous sheet comprising a metal-containing material over a substrate;
    roll wrapping at least one intermediate layer over the at least one inner layer, the at least one intermediate layer having a honeycomb structure; and
    roll wrapping at least one outer layer covering the at least one intermediate layer, the at least one outer layer containing a continuous sheet comprising a metal-containing material;

constraining the at least one outer layer with a shrink-wrap material;

connecting the at least one inner and outer layers to the at least one intermediate layer; and removing the shrink-wrap material and the substrate;

wherein the at least one inner layer contains a plurality of layers, the at least one outer layer contains a plurality of layers, or the at least one inner and outer layers contain a plurality of layers.

26. A contoured structural member made by the method comprising:

roll wrapping at least one inner layer using a continuous sheet comprising a metal-containing material over a substrate;

roll wrapping at least one intermediate layer having a honeycomb structure to be substantially contiguous with the at least one inner layer; and roll wrapping at least one outer layer to be substantially contiguous with the at least one intermediate layer, the at least one outer layer containing a continuous sheet comprising a metal-containing material;

constraining the at least one outer layer with a shrink-wrap material;

connecting the at least one inner and outer layers to the at least one intermediate layer; and removing the shrink-wrap material and the substrate;

wherein the at least one inner layer contains a plurality of layers, the at least one outer layer contains a plurality of layers, or the at least one inner and outer layers contain a plurality of layers.

27. A method for making a contoured structural member, comprising:

providing a plurality of inner layers comprising a metal-containing material;

roll wrapping at least one intermediate layer over the plurality of inner layers, the at least one intermediate layer having a ribbed structure; and providing at least one outer layer over the at least one intermediate layer, the at least one outer layer comprising a composite material; and connecting the at least one inner and outer layer to the at least one intermediate layer.

28. A method for making a contoured structural member, comprising:

providing at least one inner layer comprising a composite material;

roll wrapping at least one intermediate layer over the at least one inner layer, the at least one intermediate layer having a ribbed structure; and providing a plurality of outer layers over the at least one intermediate layer, the plurality of outer layers comprising a metal-containing material; and connecting the at least one inner and outer layer to the at least one intermediate layer.

* * * * *